United States Patent [19]

Ho

[11] Patent Number: 4,484,305
[45] Date of Patent: Nov. 20, 1984

[54] PHONETIC MULTILINGUAL WORD PROCESSOR

[76] Inventor: Paul Ho, 2042 Sanborn Ave., Los Angeles, Calif. 90027

[21] Appl. No.: 330,266

[22] Filed: Dec. 14, 1981

[51] Int. Cl.³ .................................................. G06F 15/38
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,932,859 | 1/1976 | Kyriakides et al. | 364/900 |
| 3,938,099 | 2/1976 | Hyder | 364/900 |
| 4,122,533 | 10/1978 | Kubinak | 364/900 |
| 4,130,882 | 12/1978 | Swanstrom et al. | 364/900 |
| 4,159,536 | 6/1979 | Kehoe et al. | 364/900 |
| 4,193,119 | 3/1980 | Arase et al. | 364/900 |
| 4,218,760 | 8/1980 | Levy | 364/900 |
| 4,327,421 | 4/1982 | Wang | 364/900 |
| 4,328,562 | 5/1982 | Hashimoto et al. | 364/900 |
| 4,365,235 | 12/1982 | Greanias et al. | 364/900 |
| 4,365,315 | 12/1982 | Jamnik | 364/900 |
| 4,383,306 | 5/1983 | Morimoto et al. | 364/900 |

*Primary Examiner*—Charles E. Atkinson
*Assistant Examiner*—Gary V. Harkcom
*Attorney, Agent, or Firm*—Keith D. Beecher

[57] ABSTRACT

A word processor using a standard United States keyboard is provided which enables appropriate Chinese, Japanese, or other characters, to be selected phonetically and recorded for subsequent print-out. The letters on the standard keyboard are actuated to display characters corresponding to the Chinese words or syllables, each of which generally includes a consonant and a vowel. The keys of the keyboard are marked on top with letters corresponding phonetically with the consonant portions of the Japanese, Chinese or other words. The consonants are phonetically selected by the phonetic standard American letters on the keyboard, since the correspondence between the Chinese or Japanese consonants and the English letters are generally understood by Chinese and Japanese people. The keys on the keyboard are also marked, on the front sides, with characters and letters corresponding phonetically to the vowel portions of the Chinese or Japanese words. For each word, the first key operated constitutes a phonetic selection of the consonant of a desired word, and the second key operated constitutes a phonetic selection the vowel of the desired word. The result for most selected words, unless the exact vowel tone is selected, is that a number of different characters corresponding phonetically to the selected words, and variants, are displayed, and the operator then selects the proper character corresponding to the correct word, and causes only the proper character to be transferred to the text portion of the display screen. When the tone of the desired is known further keys may be operated which serve to reduce the number of variance displayed. The process is repeated until a complete page of selected correct characters appear on the text portion of the screen, and at that time the page is transferred to a floppy disc memory for subsequent print out. The word processor of the invention can also be adapted to other languages, such as Russian, Arabic, Korean, etc.

5 Claims, 4 Drawing Figures

FIG. 3 — U.S.A. STANDARD KEYBOARD

FIG. 4

PHONETIC MULTILINGUAL WORD PROCESSOR

BACKGROUND OF THE INVENTION

A problem which has been considered to be virtually unsolvable is that of providing apparatus with a practical keyboard so as to enable Chinese and Japanese characters, and the like, to be typed at practical speeds. At present, the Chinese language is represented by approximately 10,000 Han characters, and to be passably literate, a person must known at least 2,000 characters.

Linguistic and computer experts have been working on various complex keyboard arrangements and coding schemes so as to allow Chinese, Korean and Japanese people to use computers in their own language.

The major problem in producing a computer-generated Chinese or Japanese text, and in producing a computer-readable Chinese code, is that no efficient means has been developed in the prior art for entering data to select the symbols that represent the words.

As pointed out in an article by Robert J. Trotter in Science News (July 11, 1981), perhaps one answer to the problem would be to provide an optical scanner that could read the 10,000 Chinese characters, or the Japanese or Korean characters which are based on the Chinese. However, this is not possible with current computer technology.

As also described in the Trotter article, Wang Laboratories of Lowell, Mass. have taken a different approach to the problem. Instead of displaying thousands of characters on a keyboard, as is the case in the IBM system, the Wang system uses a coding technique, so that a minimum number of keys can be used to generate the 10,000 characters. Each character in the Wang machine has a 6-digit identification number based on the shape of the character. However, again, only specialized operators can develop the skills necessary to operate the Wang type of system with any degree of efficiency.

A system has also been developed at Cornell University by Paul L. King which uses a 12-digit keyboard to enter the 10,000 characters. Each digit describes a basic shape used in Chinese characters in one of four quadrants into which all the characters are divided. By selecting up to four keys, an operator can identify an entire character. Because of the complexity of the characters, however, the same four quadrants of different characters may be sufficiently similar to be described by the same digits but very different in meaning. When that occurs, the system uses linguistic rules automatically to select the correct character and, if the automatic selection process is not specific enough, the computer displays the remaining choices and the operator makes a manual selection.

In the system of the present invention, and as will be described, in a manner similar in some respects of the King system, a simple keyboard is used so that characters may be selected on a phonetic basis, but, unlike the King system, no attempt is made to form the characters on a quadrant basis, or to provide an automatic selection process. Instead, unless precise tones are selected, all characters corresponding to the phonetic selection initiated in the system of the present invention, but having different meanings, are displayed, and, in each instance, the operator makes a manual selection of the proper character from the displayed group.

In a system developed by IBM, high resolution allows for accurate video display of the complex Chinese characters, and an ink jet printer is used to produce 37 characters per second at the terminal. The system of the present invention is predicated upon state-of-the-art hardware and software, such as incorporated into the King and IBM systems, However, as described briefly above, in the system of the present invention, a standard keyboard is used in which the keys represent phonetically the consonant and vowel of each Chinese word. The system of the invention incorporates hardware and software similar to that used in the IBM and king systems to display Chinese characters when the keyboard is operated. However, unlike the IBM system, the system of the invention displays a number of characters corresponding to a desired word and its variants, each time the appropriate keys are actuated, and the operator then selects the proper character from the display so that the selected character only is transferred to the text portion of the display screen.

Thus, instead of the operator having to create or select the desired character from operation of the keyboard, as in the IBM and King systems, the operator actuates a standard keyboard to display a number of characters corresponding to certain phonetic sounds, and the operator selects the desired character from those displayed.

The Chinese language, for example, has thirty-eight vowel sounds, and the Japanese language has three additional vowel sounds. The Chinese and Japanese language each has twenty single consonant sounds, and three double consonant sounds (SH, CH, ZH). Also each vowel sound, and each consonant sound has five separate tones represented by the universal symbols —, /, +, \ and *. Purely Japanese characters are identified by the symbol @.

The system of the invention only requires knowing the sound of the word and representing it with a phonetic alphabet. Each word is broken down into three parts:

(1) The first part is 1 of the 23 consonants or double consonants.

(2) The second part is 1 of the 41 vowels or vowel types.

(3) The third part is 1 of the five tones.

The keyboard used in the system of the invention enables the selection of the three parts of a word by striking only 3 keys. Once the three parts of the word have been entered, the desired character along with any other characters having the samd sound (homonyms) will appear on the display screen. The desired character is then selected and entered on the text portion of the display screen.

If the user does not know the tone for the character which he desires, he can enter only the consonant and vowel parts of the word. This will cause up to 64 characters (representing all the different tones of the same phonetic word) to appear on the display screen for selection. The final selection technique from the displayed homonyms has been developed in the system of the invention for maximum efficiency:

(1) The homonyms have been arranged in the order of most frequent use.

(2) Two selection techniques are available: cursor control and 2 digit numbers.

If only one character exists for a particular phonetic word, it is automatically selected and entered in the text portion of the display.

The system of the invention allows entering of characters into text which can be stored on floppy discs in 20 page files. Each page has the capacity to store 768 characters. Once entered and stored, these characters can be printed or copied or merged with characters from other pages on the same or other discs.

Many features are available in the system of the invention to permit manipulation of the characters while preparing the text. Some of these features are:

(1) Shifting characters up, down, left or right.

(2) Rotating characters left or right.

(3) Exchanging and rearranging characters or lines of characters.

(4) Scrolling up and down.

(5) Marking characters in text and duplicating into text later.

Most of the languages of the world are based on the phonetic alphabet. The same letter has the same or similar sound from language-to-language with a few variations. Now in China, the students in grade school and junior high school are being traught to represent Chinese words with a phonetic alphabet. Chinese has many dialects. The wide acceptance of the phonetic word processor of the invention will tend to unify the Chinese language and bring China rapidly into communication with the Western world and into the computer age.

BRIEF DESCRIPTION OF THE DRAWINGS

FIG. 3 is a view of the tops of the keys of the keyboard of the word processor of FIG. 1; and FIG. 4 is a view of the front faces of the keys of the keyboard of the word processor of FIG. 1.

DETAILED DESCRIPTION OF THE ILLUSTRATED EMBODIMENT

Figure 2:
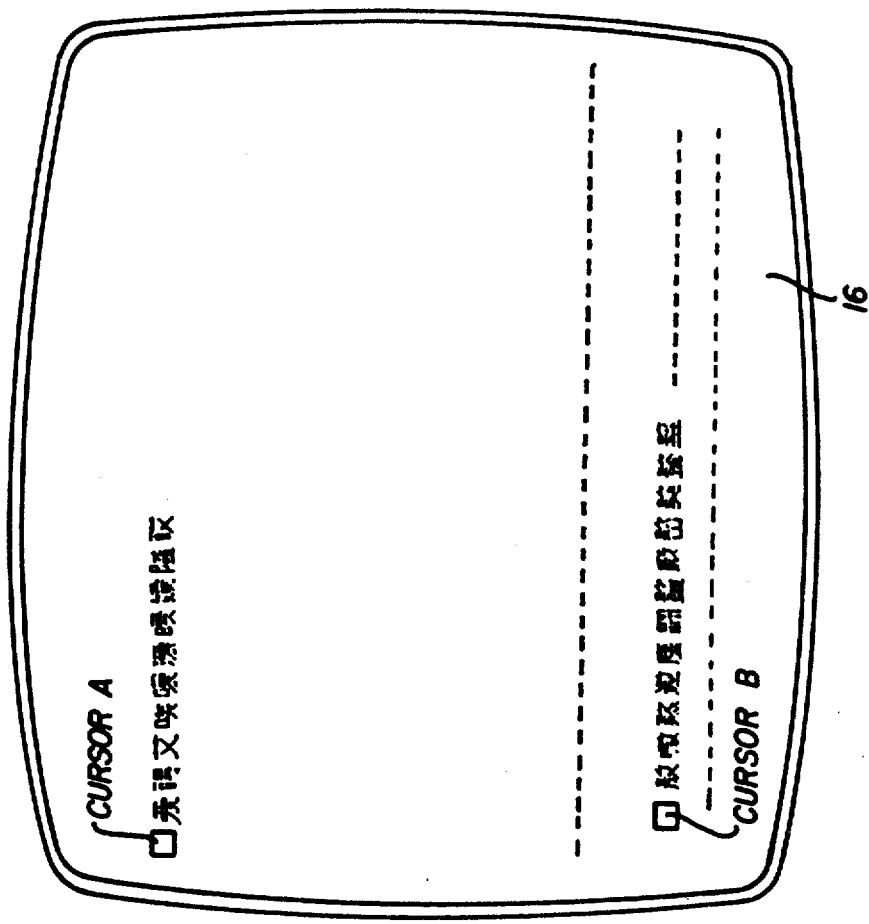
FIG. 2 is an enlarged view of the screen of the word processor of FIG. 1.

In the practice of the present invention, and as explained briefly above, the system of the present invention includes a word processor 10 which is coupled to a usual printer 12. The word processor 10 has a keyboard 14, and a display screen 16, as is the usual practice.

Figures 3, 4:
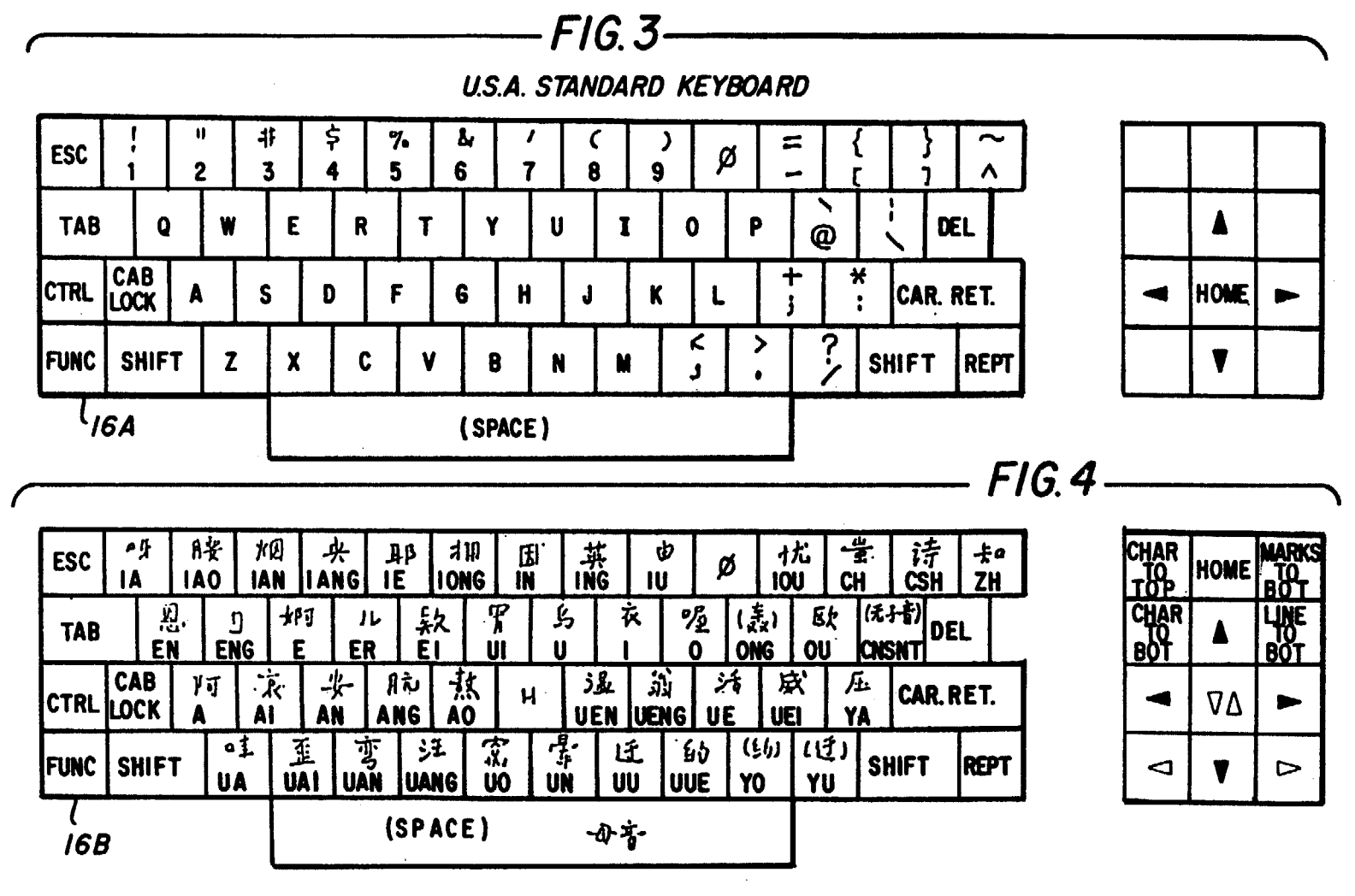

The keyboard 16, as shown in FIG. 3 has the conventional keys, and the tops of the keys are inscribed with the usual letters and symbols of a standard keyboard, as designated 16A in FIG. 3. In accordance with the invention, the front faces of the keys of the keyboard are inscribed with designations corresponding, for example, to the vowel sounds of the particular language to which the system has been adapted. In the illustrated embodiment, the vowel sounds, which are shown in both letters, and in Chinese characters, which are inscribed on the front faces of the keys are designated 16B in FIG. 4.

It is to be understood that the internal construction of the word processor 10 is well known to the art, and the particular word processor is constructed so that when the keys are operated of the keyboard, Chinese characters are displayed on the screen 16 for subsequent storage on, for example, a floppy disc in disc drive 18, and for eventual print-out by printer 12.

Since the manner in which a word processor may be constructed to display and store Chinese or other characters as particular keys of a keyboard are actuated is known to the art, it is believed unnecessary to provide a detailed description of the internal composition of the word processor in this specification. Also, and as will become evident as the description proceeds, provisions are made so that the particular characters incorporated in the word processor are expanded to encompass the Japanese as well as the Chinese language, and also the system may be modified to incorporate other languages, such as Arabic, Russian, and the like.

In a constructed embodiment of the invention, a word processor manufactured and sold by Columbia Data Products of Columbia, Md. was used. The processor itself was not changed in any way, with the exception of the addition of an additional memory (EPROM) containing appropriate software for the system of the invention; and with the further exception that the auxiliary keyboard to the right in FIG. 3 was modified to the form shown to the right in FIG. 4, and the additional notations shown in FIG. 4 were inscribed on the front faces of the keys of the standard keyboard of FIG. 3.

All of the original programs of the word processor remain intact, and the word processor may be used to perform its normal functions.

In order to operate in accordance with the concepts of the present invention, a phonetic dictionary (see Appendix) is entered into the machine, and subsequently stored on a magnetic disc in disc drive 18, which also may be used for storage of the word processor's pages generated within the machine. In like manner, a Russian phonetic dictionary, an Arabic phonetic dictionary, or the like, can be entered into the machine and stored on other magnetic discs, and the other discs may be inserted in the drive 18 so that the machine may be used to process the other particular languages.

To operate the machine, the EPROM containing the software for the system is activated, and the appropriate disc bearing the dictionary shown in the Appendix is placed in the disc drive 18, and the "E" key is pressed to establish the edit mode. The first page of the text is displayed, for example, although any page may be selected for editing purposes. The cursor "A" (FIG. 2) for the text portion is moved to the left and right and up and down on the screen by operating the black arrow keys, and it may be returned to its illustrated position by operating the "HOME" key. The cursor "B" of the bottom portion is set to the home position by operating the function (∧) key together with the "H" key, or by operating the white arrow keys. The machine is set to the Chinese mode, for example, by operating the function key (∧) in conjunction with the "C" key.

Then, the consonant portion of the first word is selected by pressing a selected one of the alphabet keys on the standard keyboard shown in FIG. 3. Three double consonant keys are provided which are the last three keys of the upper row (as indicated on the modified keyboard of FIG. 4. If the desired word only contains a vowel sound, the "no consonant" key is pressed, as indicated on the modified keyboard. If the desired word contains only a consonant sound, the SPACE key is pressed after the appropriate consonant key. Then, for words containing a vowel sound, the key representing the vowel portion of the word is pressed (as indicated on the modified keyboard).

If the operator is not sure of the proper tone of the word he has selected phonetically, the carriage return key is pressed, and all of the characters corresponding to the selected consonant and vowel sounds appear on the lower part of the screen, as indicated by the dictionary in the appendix. Since these characters can be as many as 64 different characters, two rows capable of accommodating 32 characters each are provided in the lower portion of the screen, as shown in FIG. 2.

If, on the other hand, the operator knows the proper tone of the desired word, the appropriate tone symbol key on the standard keyboard (−, /, +,\ , *) is pressed, after the consonant and vowel portions have been selected, and then the carriage return key is operated to display fewer characters at the bottom of the screen than was the case when no tone symbol was selected, and as shown by the dictionary in the appendix. If a Japanese character is to be selected the @ key is pressed after the consonant and vowel are selected.

Accordingly, if no tone key is pressed, all the characters corresponding to a selected consonant and vowel will be displayed at the bottom of the screen; but if a tone key is also pressed, only those characters corresponding to that appropriate tone will be displayed, as shown in the dictionary.

It will be appreciated that of all the characters displayed, only one character will represent the particular word desired by the operator, and that word is selected either by operating the number keys on the standard keyboard corresponding to the position of the desired character in the lower portion of the screen (1–64), or by operating the white arrow keys on the auxiliary keyboard to move cursor "B" to the appropriate character on the first or second row. Then, the CARRIAGE RETURN key is operated to shift the selected character to the position on the upper text portion of the screen designated by cursor "A".

Therefore, by repeated operations, all the proper characters may be displayed on the upper portion of the screen in orderly rows and columns. Each time a character is transferred from the lower portion of the screen to the upper portion, the lower portion is cleared, so that the operation may be repeated for the next word.

If a mistake is made in entering characters into the lower portion of the screen, the "ESC" key is operated which clears the lower portion, and the correct group of characters may then be entered by following the operations described above. If a mistake is made in selecting the proper group of characters before they are entered on the bottom portion of the screen, this may be rectified merely by retyping the correct consonant, vowel and tone keys.

To correct a character in the text in the upper portion of the screen, the cursor "A" is moved to the particular character by operating the black arrow keys on the auxiliary keyboard. A correct character may then be entered in that position by the operations described above. Normally, however, the characters entered from the bottom portion to the top portion of the screen will appear in an orderly sequence.

To cause Chinese characters to be displayed the function key (∧) and the "C" key must be actuated to set the system to the Chinese mode. If it is desired to intersperse English words in the Chinese text, the function key (∧) and the "E" key are operated to set the system to the English mode for the duration of the particular English word or words, after which the machine is returned to the Chinese mode.

Various operations are possible with the constructed embodiment of the invention. For example, characters or lines of characters may be displayed on the lower portion of the screen without being deleted from the text, and these characters or lines of characters may be repeated in the next available portions of the text. Likewise, marked characters may be repeated in the lower portion of the screen without obliterating the characters from the text, and then selected a character at a time, from the lower portion to the next available positions in the text. Other operations, such as moving groups of characters to the right or left so that other characters may be inserted, transposing characters, and so on, can also be carried out.

For example, if it is desired to repeat selected characters already appearing in the text at the next available positions in the text, the function key (∧) is pressed together with the "B" key, and this operation causes the lower portion of the screen to be displayed. The cursor "A" is then moved to a selected character in the text, and the "CHAR TO BOTTOM" key is pressed to cause that character to be displayed in the lower portion of the screen, without being obliterated from the text. Any number of selected characters from the text can likewise be displayed in sequence in the lower portion of the screen. Each of the characters displayed in the lower portion of the screen can then be transferred to the next available positions in the text portion by pressing the "CHAR TO TOP" key. If the carriage return key is pressed for the last character to be transferred to text, the lower portion of the display will automatically disappear. Otherwise, after the last character has been transferred to text, the (∧) and the "T" key must be pressed to cause the lower portion of the display to disappear.

Any line of information in the text can be displayed in the lower portion of the screen without obliterating that line from the text, this being achieved by moving cursor "A" to the particular line to be displayed, and by then pressing the (∧) key and the "B" key, and by then pressing the "LINE TO BOTTOM" key. The line can then be inserted in the next available line of the text by operating the "CHAR TO TOP" key.

Likewise, selected characters in the text can be marked by pressing the (∧) and the "M" keys, after cursor "A" has been moved to the character to be marked. This operation can be repeated for a number of selected characters to be marked. All the marked characters can then be transferred together to the bottom display by pressing the "MARKS TO BOTTOM" key. The characters can then be shifted from the bottom display to the next available positions in the text by pressing the "CHAR TO TOP" key.

Marked characters are unmarked by pressing the (∧) key and the (U) key. If cursor "A" is over a marked character, only that mark is removed. Otherwise, all marks are removed. When keys (∧) (N) are pressed, the cursor is moved to the next mark.

The (∧) key and the "X" key can be pressed to exchange any one line in from text (as indicated by cursor "A") with the line designated by cursor "B" in the bottom display.

All of the foregoing and other possible functions serve to facilitate the formation of the text characters, in instances where certain characters, or lines of characters, already entered in text are to be repeated, and also to permit insertions and transpositions to be made.

Figure 1:
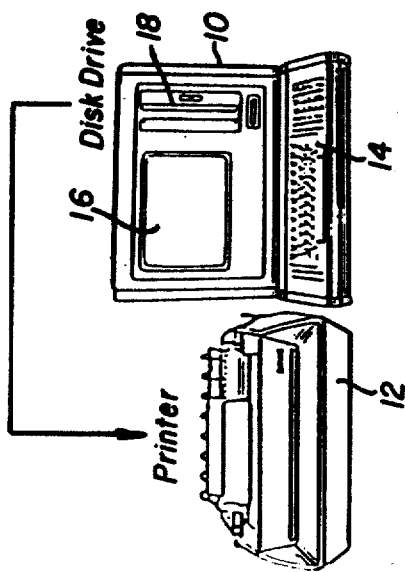
FIG. 1 is a representation of a word processor which incorporates the concept of the present invention, and an associated printer.

In entering the dictionary of the Appendix into the word processor, dot patterns of each character are made to establish the digital words corresponding to each character, and these patterns are punched into a usual teletype tape. The tape is then read into the memory of the word processor in the sequence shown by the dictionary, with each character or group of characters being addressed in memory by pressing the keys corresponding to those characters, or groups of characters, as shown in the dictionary. When all of the characters have been loaded into the memory of the word processor, the contents of the memory may be shifted into a removable flopply disc, so that the dictionary will be available for the machine whenever that particular disc is inserted into the disc drive 18 of FIG. 1.

It will be appreciated that while a particular embodiment of the invention has been shown and described, modifications may be made. It is intended in the claims to cover all modifications which come within the spirit and scope of the invention.

APPENDIX

VOWELS OR VOWEL TYPES

| A  阿 | E  啊 | I  衣 | O  喔 | U  屋 | YA  呀 |
|---|---|---|---|---|---|
| AI  挨 | EI  欸 | IA  呀 | ONG | UA  挖 | YO  哟 |
| AN  安 | EN  恩 | IAN  烟 | OU  欧 | UAI  歪 | YU  迂 |
| ANG  肮 | ENG  鞥 | IANG  央 | | UAN  弯 | |
| AO  熬 | EF  儿 | IAO  腰 | | UANG  汪 | |

|   |   |
|---|---|
| IE  耶 | UE (XUE 靴) |
|  | UEI  威 |
| IN  音 | UEN  温 |
| ING  英 | UENG  翁 |
|  |  |
| IONG  拥 | UI (CHUI 吹) |
| IOU  忧 | UN (YUN 晕) |
|  |  |
| IU (QIU 秋) | UO  窝 |
|  |  |
|  | UU (NUU 女) |
|  | UUE (NUUE 虐) |

CONSONANTS OR DOUBLE CONSONANTS

| B  波 | C  疵 | D  得 | F  佛 | G  哥 | H  何 | J  几 | K  科 | L  勒 | M  马 |
|---|---|---|---|---|---|---|---|---|---|
| N  呢 | P  坡 | Q  欺 | R  日 | S  思 | T  特 | W  乌 | X  希 | Y  医 | Z  资 |
| CH  吃 |  |  |  | SH  诗 |  |  |  |  | ZH  知 |

( 波疵得佛得特的勒哥科呢基欺希 日资雌思  知吃诗 )

PHONETIC DICTIONARY FOR SINO-DATA CHINESE WORD PROCESSOR

A-          阿啊腌啊

A/          · 啊

A+          啊

| | |
|---|---|
| A\ | 啊 |
| A* | 啊 |
| A@ | 呵了 |
| AI- | 哎哀挨埃唉娭锿 |
| AI/ | 癌呆捱皑雤 |
| AI+ | 迭蔼藹嗳欸 |
| AI\ | 爱碍艾唉嗳瑷嗳隘砹 |
| AN- | 安厂广庵按鞍谙鹌鞌 |
| AN+ | 俺埯荽垵铵 |
| AN\ | 暗犴按案胺豻行 |
| ANG- | 肮 |
| ANG/ | 昂 |
| ANG\ | 盎 |
| AO- | 熬凹 |
| AO/ | 敖嗷獒遨廒翱螯敖鳌鏊鰲 |
| AO+ | 袄拗媪 |
| AO\ | 奥奧澳懊拗坳坳岙鏊鳌 |
| BA- | 八捌扎叭巴吧疤爸芭钯邑 |
| BA/ | 拔跋菝 |
| BA+ | 把靶钯 |
| BA\ | 爸霸坝把耙罢鲅鮁 |
| BA* | 罢吧 |
| BA@ | ば八 |
| BAI- | 剥掰 |
| BAI/ | 白 |
| BAI+ | 百佰伯柏捭摆 |
| BAI\ | 败拜稗粺 |
| BAN- | 班斑扳般搬颁叛细飚 |
| BAN+ | 板版舨阪感 |
| BAN\ | 半办扮伴拌绊拌瓣 |
| BANG- | 邦帮梆浜 |
| BANG+ | 梆膀绑 |
| BANG\ | 傍谤棒磅傍蒡哥 |
| BAO- | 包胞炮苞剥褒煲雹孢 |

| | |
|---|---|
| BAO/ | 薄雹 |
| BAO+ | 保宝饱堡裤褓褐 |
| BAO\ | 报抱刨豹鲍暴瀑爆钧 |
| BE@ | ベベ |
| BEI- | 杯悲背卑庳萆碑胺 |
| BEI+ | 北 |
| BEI\ | 信贝背被备备狈悖意焙碚狈蓓祯邶蒂臂 |
| BEI* | 呗臂 |
| BEN- | 奔贲拼锛 |
| BEN+ | 本苯畚 |
| BEN\ | 夯苯奔坌俸 |
| BENG- | 崩绷祊唪 |
| BENG/ | 甭 |
| BENG+ | 绷 |
| BENG\ | 蚌泵迸甏镚榜 |
| BI- | 逼 |
| BI/ | 荸鼻 |
| BI+ | 匕比彼笔俾鄙妣沘秕 |
| BI\ | 炉毕币闭秘泌毖弊敝界滗壁璧碧赞值辟庇毙陛匹亚钠贲弱壁烨浡痹哔蹕些辟毂昆苾睥辟 |
| BIE@ | びじ |
| BIAN- | 边缘编迈苀编煸蝙 |
| BIAN+ | 扁贬窆匾褊碥 |
| BIAN\ | 便变遍辨辩辫弁下汴忭抃 |
| BIAO- | 标彪镖膘镖德乳 |
| BIAO+ | 表婊裱 |
| BIAO\ | 俵镖螵 |
| BIE- | 虌憋鳖 |
| BIE/ | 别瞥 |
| BIE+ | 瘪 |
| BIE\ | 别 |
| BIN- | 宾傧滨妣彬频邠傧镇缤豳 |
| BIN\ | 殡滨摈膑髌 |
| BING- | 并冰并俦 |

| | |
|---|---|
| BING+ | 丙屏饼禀柄炳棅郱 |
| BING\ | 并病柄摒 |
| BO- | 波玻菠拨剥播钵停崎 |
| BO/ | 百佑帛柏伯泊胎驳情浡葧勃浡晚膊薄伐箔壹踣犎珀鹄 |
| BO+ | 跛颇 |
| BO\ | 薄菠檗擘 |
| BO? | 卜啵 |
| BO? | 饽末 |
| BU- | 晡逋 |
| BU/ | 醭 |
| BU+ | 卜补捕哺堡 |
| BU\ | 不步布佈部簿埠捕怀坏誩 |
| BU? | ぶラ |
| BYA? | び |
| BYO? | び |
| BYU? | び |
| CA- | 折茬嚓礤 |
| CA+ | 礤 |
| CAI- | 猜 |
| CAI/ | 才材财栽 |
| CAI+ | 采彩睬踩 |
| CAI\ | 采菜寀 |
| CAN- | 夕步骖 |
| CAN/ | 蚕残惭 |
| CAN+ | 惨憯 |
| CAN\ | 粲灿璨暴 |
| CANG- | 仓苍伧沧胞鸧 |
| CANG/ | 苼 |
| CAO- | 操糙 |
| CAO/ | 曹槽漕嘈蝤艚 |
| CAO+ | 草 |
| CE\ | 册策侧厕测侧 |
| CEN- | 参 |
| CEN/ | 岑涔 |

| | |
|---|---|
| CENG/ | 层曾嶒 |
| CENG\ | 蹭 |
| CHA- | 叉差插喳嚓馇杈偅 |
| CHA/ | 禾查叉察搽猹垞茬蟾碴 |
| CHA+ | 衩叉镲躂 |
| CHA\ | 蕃衩刹岔诧权汊佗姹 |
| CHA◦ | 怎夭 |
| CHAI- | 祈差钗 |
| CHAI/ | 柴侪豺 |
| CHAI+ | 跴 |
| CHAI\ | 瘥瘥 |
| CHAN- | 裈掺觇 |
| CHAN/ | 谗蝉馋单禅婵傣嵝巉潺廛瀍澶潭 |
| CHAN+ | 产护沪闱谄崭铲骣 |
| CHAN\ | 忏划颤羼颤 |
| CHANG- | 昌猖娼伥阊菖鲳 |
| CHANG/ | 长常尝裳场肠偿徜嫦苌 |
| CHANG+ | 厂厰场昶敞氅 |
| CHANG\ | 倡唱怅鬯怆 |
| CHAO- | 吵抄炒超剿绰焯 |
| CHAO/ | 朝潮唓晁巢 |
| CHAO+ | 炒吵 |
| CHAO\ | 耖 |
| CHE- | 车砗 |
| CHE+ | 尺扯 |
| CHE\ | 澈彻彻坼掣 |
| CHEN- | 抻嗔瞋琛郴 |
| CHEN/ | 晨长沉忱陈尘宸臣諃诚 |
| CHEN+ | 碜 |
| CHEN\ | 称衬趁谶榇龀 |
| CHEN◦ | 伧 |
| CHENG- | 瞠樘称牚柽铛蛏赪 |
| CHENG/ | 成诚城盛呈乘程承丞澄惩恒埕宬枨诚酲塍 |

| | |
|---|---|
| CHENG+ | 逞骋 |
| CHENG\ | 秤 |
| CHI- | 吃鸡苦些嗤媸哧哆嘻蜘蜘 |
| CHI/ | 持迟池弛驰匙墀踟篪茌 |
| CHI+ | 尺呎齿耻敌褫侈 |
| CHI\ | 斥赤彳翅叱斥炽饬敕傺 |
| CHI? | 亏开 |
| CHO? | 冢 |
| CHONG- | 充冲忡憧憧春茺种 |
| CHONG/ | 虫种重素 |
| CHONG+ | 宠 |
| CHONG\ | 铳冲 |
| CHOU- | 抽细瘳 |
| CHOU/ | 仇稠惆绸绸愁酬筹踌俦惆踌雠 |
| CHOU+ | 丑瞅 |
| CHOU\ | 臭 |
| CHU- | 初出樗 |
| CHU/ | 除厨橱蹰躇滁刍雏锄蜍躇徂 |
| CHU+ | 处础楚储杵褚褚 |
| CHU\ | 处触畜亍憷怵敊搐绌黜矗 |
| CHU? | 知 |
| CHUAI- | 揣搋 |
| CHUAI/ | 膪 |
| CHUAI+ | 揣 |
| CHUAI\ | 揣啜踹闯膪 |
| CHUAN- | 川穿氚 |
| CHUAN/ | 传船椽遄篇 |
| CHUAN+ | 喘舛踳 |
| CHUAN\ | 串钏 |
| CHUANG- | 窗创疮 |
| CHUANG/ | 床幢噇 |
| CHUANG+ | 闯 |
| CHUANG\ | 创闯怆 |
| CHUI- | 吹炊 |

| | |
|---|---|
| CHUI/ | 垂縋陲推捶棰箠箠 |
| CHUN- | 春椿蝽 |
| CHUN/ | 唇屯淳醇莼鹑 |
| CHUN+ | 蠢 |
| CHUO- | 歠踔逴 |
| CHUO\ | 淖説敠啜綴婼 |
| CI- | 刺差疵玼 |
| CI/ | 瓷茨辞词祠雌茈罃茲茨齹 |
| CI+ | 此泚跐 |
| CI\ | 次刺赐伺伲 |
| CONG- | 丛匆怱囱聪驄枞苁 |
| CONG/ | 丛丛淙淙 |
| COU\ | 凑腠腠 |
| CU- | 粗 |
| CU/ | 徂徂 |
| CU\ | 促卒酷酢簇蔟猝鼀蹙卒 |
| CUAN- | 汆氼蹿镩 |
| CUAN/ | 攒 |
| CUAN\ | 篡竄 |
| CUI- | 催摧崔衰缞榱 |
| CUI+ | 蓷 |
| CUI\ | 悴脆翠萃稡淬疩膵啐蘂 |
| CUN- | 村皴 |
| CUN/ | 存蹲 |
| CUN+ | 忖 |
| CUN\ | 寸吋 |
| CUO- | 磋搓蹉撮 |
| CUO/ | 嵯痤嵳醝 |
| CUO+ | 脞 |
| CUO\ | 错措厝挫剒矬莝 |
| DA- | 咑搭褡嗒叮噠 |
| DA/ | 打达荅瘩妲怛笪耷粗靼 |
| DA+ | 打 |
| DA\ | 大眔炟汏 |

| | |
|---|---|
| DA● | 搭 |
| DAI- | 呆待呔 |
| DAI+ | 歹逮傣 |
| DAI\ | 大代袋待贷带逮怠殆黛戴傣道苷弍给逮 |
| DAN- | 丹单担眈箪酖耽殚聃郸儋 |
| DAN+ | 胆疸掸赕 |
| DAN\ | 旦蛋担但石蛋淡弹诞惮啖澹氮萏萏 |
| DANG- | 当档珰铛 |
| DANG+ | 党挡说 |
| DANG\ | 当档挡宕菪荡凼砀 |
| DAO- | 刀叨氘釖 |
| DAO/ | 捣 |
| DAO+ | 导岛捣祷倒蹈 |
| DAO\ | 到道稻倒盗悼焘纛 |
| DE/ | 得德锝 |
| DE● | 的底地得喊 |
| DE? | でヂ |
| DEI+ | 得 |
| DEN\ | 扽 |
| DENG- | 灯登噔蹬 |
| DENG+ | 等戥 |
| DENG\ | 邓澄凳瞪磴镫 |
| DI- | 低提滴堤氐羝镝 |
| DI/ | 敌的笛籴迪狄嫡涤荻翟嘀嫡嘀髢觌 |
| DI+ | 底抵诋邸氐坻低砥骶 |
| DI\ | 弟第的地帝棣蒂谛怖弟碲缔递娣睇 |
| DIA+ | 跢 |
| DIAN- | 滇颠癫巅掂敁 |
| DIAN+ | 点典碘踮 |
| DIAN\ | 电店惦佃垫其殿甸淀靛玷簟钿簟坫贴 |
| DIAO- | 刁凋碉貂雕叼汈鲷 |
| DIAO\ | 吊掉调钓铞铫茶窎 |
| DIE- | 跌爹 |
| DIE/ | 迭叠蝶谍碟喋牒胅映怾绖喦堞鲽鲽 |

| | |
|---|---|
| DING- | 丁仃钉叮疔靪町玎酊町耵 |
| DING+ | 顶鼎酊 |
| DING\ | 定订钉腚碇腚订 |
| DIU- | 丢铥 |
| DO@ | 乏下 |
| DONG- | 东冬咚氡岽鸫 |
| DONG+ | 董懂 |
| DONG\ | 同动冻栋恫洞垌峒硐胨胴 |
| DOU- | 都兜蔸篼唗 |
| DOU+ | 斗抖陡蚪枓钭 |
| DOU\ | 斗豆痘逗读饾脰窦 |
| DU- | 都督嘟都尿 |
| DU/ | 毒独读犊渎袚梵髑髑髑 |
| DU+ | 肚堵睹赌笃 |
| DU\ | 肚杜妒度渡镀王蠹 |
| DUAN- | 端 |
| DUAN+ | 短 |
| DUAN\ | 断段缎煅碫椴簖 |
| DUI- | 堆 |
| DUI\ | 队对兑碓怼敦 |
| DUN- | 吨惇敦墩撴憝镦礅 |
| DUN+ | 盹趸不 |
| DUN\ | 盾遁顿囤饨炖沌砘 |
| DUO- | 多哆咄裰掇踱 |
| DUO/ | 夺度铎踱 |
| DUO+ | 朵躲跺垛 |
| DUO\ | 花舵惰堕剁驮跺垛拙驰 |
| E- | 阿屙娥 |
| E/ | 鹅俄额讹娥峨绒哦莪囮锇 |
| E+ | 恶 |
| E\ | 饿恶垩厄扼遏愕谔腭蕚呃轭鄂鹗萼颚鄂鳄 |
| E@ | 欸工 |
| EI/ | 欸 |
| EI+ | 欸 |

| | |
|---|---|
| EI\ | 欸 |
| EN- | 恩蒽 |
| EN\ | 摁 |
| ENG- | 鞥 |
| ER/ | 儿而鸸 |
| ER+ | 尔耳迩饵洱珥铒 |
| ER\ | 二式贰佴 |
| FA- | 发 |
| FA/ | 乏伐罚阀筏垡 |
| FA+ | 法砝 |
| FA\ | 发珐 |
| FAN- | 帆番藩翻蕃幡 |
| FAN/ | 凡颁烦樊矾墦璠矾蹯蹯 |
| FAN+ | 反返 |
| FAN\ | 犯饭泛贩范梵畈 |
| FANG- | 方芳妨坊访仿邡 |
| FANG/ | 防妨房肪坊魴 |
| FANG+ | 仿访纺昉舫 |
| FANG\ | 放 |
| FEI- | 飞非啡妃菲蜚霏绯靠 |
| FEI/ | 肥淝腓 |
| FEI+ | 匪诽悱奜蜚篚棐 |
| FEI\ | 筛费废沸吠痱芾怫狒镄 |
| FEN- | 分吩芬纷氛棻芳酚瞓 |
| FEN/ | 汾焚汾棻濆豮豮 |
| FEN+ | 粉 |
| FEN\ | 奋分份忿偾葑偾 |
| FENG- | 丰封风沨疯峰烽蜂葑渢葑沣邦丰 |
| FENG/ | 冯逢缝 |
| FENG+ | 讽唪 |
| FENG\ | 凤奉俸缝葑賵赗 |
| FO/ | 佛 |
| FOU+ | 否缶 |
| FU- | 夫伕肤敷孵稃孵趺跗跗 |

| | |
|---|---|
| FU/ | 扶夫芙芋浮孚伕服福幅蝠蚹匐伕袱樸行弗怫祓彿氟兎氟怫彿苻氟艾茨袚芾罘罦 |
| | 罘郛罘罦罘罘瓿話鈇鈇洂瓶 |
| FU· | 父府斧訃撫甫主玩拊輔脡蒲淦簠簠 |
| FU\ | 父妇付訃附富戶礼复服腹賦鼻訃傅縛賻祓馻謝馥馥覆 |
| FU* | 咐 |
| FU? | 分了 |
| GA- | 夹咖旮嘎 |
| GA/ | 轧嘎轧尕 |
| GA* | 伽尕嘎 |
| GA\ | 尬 |
| GA? | 尜尬 |
| GAI- | 该荄垓芟奶 |
| GAI* | 改 |
| GAI\ | 丐芥盖芞丐钙概 |
| GAN- | 干羊扞肝甘泔柑苷目柑矸扞酐鳡 |
| GAN* | 皯扞敢感擀扞秆箭 |
| GAN\ | 干盱淦绀贛 |
| GANG- | 扛肛缸冈剛鋼罡犅罡堽 |
| GANG* | 崗岗 |
| GANG\ | 杠鋼囊戆 |
| GAO- | 羔穛高蒿膏睾櫜等 |
| GAO* | 稿稿果搞鎬藁缟 |
| GAO\ | 告诰膏誥郜 |
| GE- | 艾哥歌割擱疙鴿犵仡疙咯格胳 |
| GE/ | 革格閤閻柏隔骼葛蛤膈頜揭嗝骼渇 |
| GE* | 舍个合盖葛閤 |
| GE\ | 个各記硌硌 |
| GE? | げ゛ |
| GEI* | 给 |
| GEN- | 佷跟 |
| GEN/ | 哏 |
| GEN* | 艮 |
| GEN\ | 艮亙艮 |
| GENG- | 更耕羹庚康賡 |

| | |
|---|---|
| GENG+ | 耿哽梗鲠绠鲠 |
| GENG\ | 更 |
| GI? | ？？ |
| GO? | ？？ |
| GONG- | 工公弓功攻供恭宫躬蚣蚣红肛烘觥 |
| GONG+ | 巩拱汞珙拱 |
| GONG\ | 共供贡喷 |
| GOU- | 勾句沟钩枸佝篝缑鞲 |
| GOU+ | 苟狗笱枸句岣 |
| GOU\ | 勾够彀构诟购垢遘媾觏觀 |
| GU- | 估沽姑孤骨辜菇菰酤咕轱鸪蛄呱菁鹘 |
| GU/ | 骨 |
| GU+ | 古谷穀诂鼓股骨贾鸪钴毂臌蛊枯毂羖榾馉汩瀔盬鹘 |
| GU\ | 故雇估固顾痼锢梏涸菌 |
| GU? | ？？ |
| GUA- | 瓜呱刮括栝鸹呱 |
| GUA+ | 寡剐呱 |
| GUA\ | 挂卦褂诖 |
| GUAI- | 乖掴 |
| GUAI+ | 拐 |
| GUAI\ | 怪 |
| GUAN- | 关观官信棺冠矜瘝鳏纶 |
| GUAN+ | 管信琯莞 |
| GUAN\ | 贯惯观冠灌罐盥摜鹳 |
| GUANG- | 光胱洸侊 |
| GUANG+ | 广廣扩 |
| GUANG\ | 逛桄 |
| GUI- | 归龟规闺圭眼硅瑰瑰功鲑 |
| GUI+ | 宄轨匦诡垝癸宄庋 |
| GUI\ | 贵跪桂柜刽桧炅刿 |
| GUN+ | 滚磙辊混衮鲧 |
| GUN\ | 棍 |

| | |
|---|---|
| GUO- | 过锅郭蝈涡峰蝈 |
| GUO/ | 国掴帼胭号馘 |
| GUO+ | 果裹椁猓螺 |
| GUO\ | 过 |
| GYA9 | ぎゃ |
| GYO9 | ぎょ |
| GYU9 | ぎゅ |
| HA- | 哈铪 |
| HA/ | 蛤 |
| HA+ | 哈 |
| HA\ | 哈 |
| HA9 | は儿 |
| HAI- | 咳嗨 |
| HAI/ | 还孩骸 |
| HAI+ | 海胲浬醢 |
| HAI\ | 害嗐亥骇氦 |
| HAN- | 酣憨鼾顸蚶犴 |
| HAN/ | 汗含寒函还韩韩焓洽晗邯邗 |
| HAN+ | 罕喊阚喴 |
| HAN\ | 汉汗旱悍捍扞撢桉翰撖撼憾颔盂 |
| HANG- | 开 |
| HANG/ | 航行犺吭绗迒颃 |
| HANG\ | 巷沆 |
| HAO- | 蒿嚆薅 |
| HAO/ | 号豪嚎皓嗥嗥貉壕濠 |
| HAO+ | 好郝 |
| HAO\ | 号好浩耗昊皓嗥颢颢郜高镐 |
| HE- | 喝呵诃齁 |
| HE/ | 合禾何河荷和曷盍阖佉劾阂阖盍颌阂饸饹纥部阋翮籺鹖 |
| HE\ | 吓赫和荷喝褐浕阋盍高 |
| HE9 | へへ |
| HEI- | 黑嗨 |
| HEN/ | 痕 |
| HEN+ | 很狠 |

| | |
|---|---|
| HEN\ | 恨 |
| HENG- | 亨哼脖哼 |
| HENG/ | 恒横衡蘅珩桁㤉 |
| HENG\ | 横 |
| HI# | ひヒ |
| HO# | ほホ |
| HONG- | 哄烘轰叶訇薨 |
| HONG/ | 洪虹红鸿弘宏宖泓荭宾顈黉 |
| HONG+ | 哄 |
| HONG\ | 讧哄闀 |
| HOU- | 齁 |
| HOU/ | 侯喉瘊猴㹱篌骺 |
| HOU+ | 吼 |
| HOU\ | 后厚候候逅堠瘊㾂 |
| HU- | 乎呼忽唿戏㑲唿泘仔㫚䎱 |
| HU/ | 胡㧎和壶弧狐狐鹄斛囫縠葫湖猢煳瑚縠湖鹕搰硵醐 |
| HU+ | 虎琥浒 |
| HU\ | 互户沪护戽扈怙祜岵冱槲瓠鄠岋 |
| HUA- | 华花哗砉 |
| HUA/ | 划华哗铧滑猾搳骅 |
| HUA\ | 化华话划画桦 |
| HUAI/ | 怀徊淮㿸踝㚃 |
| HUAI\ | 坏 |
| HUAI* | 划 |
| HUAN- | 欢獾 |
| HUAN/ | 还环寰圜㟲澴䚣郇洹桓 |
| HUAN+ | 缓 |
| HUAN\ | 幻急浣浣奂唤涣㼝宦豢蒙痪皖漶 |
| HUANG- | 荒慌肓塃 |
| HUANG/ | 芦皇偟蝗凰徨遑隍蟥潢煌篁徨鳇涽偟喤湟 |
| HUANG+ | 谎恍晃幌 |
| HUANG\ | 晃 |
| HUI- | 灰恢诙挥㧓晖麾㣫珲䃾䯤 |
| HUI/ | 回洄茴蛔 |

| | |
|---|---|
| HUI+ | 悔毁烩 |
| HUI\ | 会卉汇贿惠慧荟溃荤会绘烩诲晦讳蕙烩哕恚遗秽昏懂 |
| HUN- | 昏婚荤阍 |
| HUN/ | 混浑混浑珲 |
| HUN\ | 混诨溷 |
| HUO- | 豁嚯攉劐耠矐 |
| HUO/ | 活和 |
| HUO+ | 火伙夥钬 |
| HUO\ | 或惑和祸获霍货祸擭嚄 |
| HYA9 | にゃ |
| 8CYH | な |
| HYU9 | にゅ |
| I9 | い |
| JI- | 几机肌饥基击叽鸡积扱迹赍稽激勣湟箕叽机讥玑跻赍唧晞觊羁乩姬期剞堲荷芨稘箘 |
| JI/ | 吉及汲岌即急级疾脊脖亚集籍藉楫辑戢瘠诘耤佶革及仮殛鼓疾踖鹡踖 |
| JI+ | 几己戺洁挤脊软凯幾 |
| JI\ | 计技记纪寄忌际济季继教祭忌暨偈妓剂伎荠覬及暨御跐觊跽稘暨寄揭忌泊垍悸剧 |
| JI9 | ぢジ |
| JIA- | 加夹家佳嘉傢枷稼夬葭袈痂䃯迦痂犽跏耞 |
| JIA/ | 夹颊荚铗恝郏戛蛱 |
| JIA+ | 假贾甲钾岬胛槚瘕 |
| JIA\ | 价嫁假架驾稼 |
| JIAN- | 尖肩间坚浅监奸开兼浅渐夫笺减煎管蒹缣搛謇菺韽鲣䩞䪕䵺鶼 |
| JIAN+ | 茧剪拣检拣俭简柬硷碱茧研兛囝锏锏睑谫戩壸寋蹇 |
| JIAN\ | 见件间谏站渐践荐饯剑前贱监建语楗视舰鉴渐臽荐徤鉴謇 |
| JIANG- | 江浆姜豕礓疆橿玉旺暀 |
| JIANG+ | 讲奖桨耩犟 |
| JIANG\ | 匠降将洚绛酱洚篢 |
| JIAO- | 艾浇胶艾苿胶跤僬煎蕵骹礁窑蛟艾娇兀僬鹪鹪 |
| JIAO/ | 嚼 |

| | |
|---|---|
| JIAO+ | 角脚侥佼挢潐炙佼皎佼侥剿饺徼敫湫 |
| JIAO\ | 叫校较觉敫徼唴嚼窌酵醮窖滘峤藠觉斠 |
| JIE- | 节皆结揭楬阶街借喈痎庴桔嗟 |
| JIE/ | 才节结劫捷讦杰柔戢渴拮诘睫偈孴婕羯碣劼洁秸颉秸 |
| JIE+ | 姐解毑 |
| JIE\ | 介界价戒借届解藉诫芥疥蚧 |
| JIE* | 家价 |
| JIN- | 今巾斤金筋衿襟津衿襟 |
| JIN+ | 尽仅紧锦谨僅卺重瑾槿 |
| JIN\ | 近仅尽劲浸进进禁噤晋妗悫靳殣觐缙珒浸浸烬 |
| JING- | 京惊泾精菁睛旌荆晶庭芏泾稉猄鶄 |
| JING+ | 井景警颈刭阱儆憬璟䵀 |
| JING\ | 劲径敬竞竟境镜净尽静痉胫暗靓视 |
| JIONG- | 扃炯 |
| JIONG+ | 窘冏炯迥泂纲灵 |
| JIU- | 究纠赳揪阄鸠啾 |
| JIU+ | 九玖久酒灸韭 |
| JIU\ | 旧就救抹咎臼舅柩柩匼僦伯鹫 |
| JU- | 居拘据车且疽沮拘鞠鞠掬泃雎菹驹苴琚駒捐 |
| JU/ | 局桔搐甪锔跼淯鵙 |
| JU+ | 兰沮咀龃沮踽筥莒苣佢苴 |
| JU\ | 巨距拒句惧踞聚剧具沮惧俱讵拒踞籧遽䢀醵苣懅惧窭屦 |
| JUAN- | 捐婤圌涓鹃脧鵑餯 |
| JUAN+ | 卷 |
| JUAN\ | 倦卷圈桊睠绢䋞鄄奲 |
| JUE- | 噘撅嗟屩 |
| JUE/ | 不决池诀倔撅崛角厥蕨嗉蹶橛谲抉觖骩噱玨玦镢痏矍獗爵诀攫 |
| JUE+ | 蹶 |
| JUE\ | 倔 |
| JUN- | 君军均钧圙麇龟皲鵙 |
| JUN\ | 俊骏菌郡捃峻浚珺峻埈狻餕 |
| JYA* | 诺 |
| JYO* | 诼 |
| JYU* | 诼 |

| | |
|---|---|
| KA- | 咖喀摸 |
| KA+ | 卡咔哈佧 |
| KA@ | 力刀 |
| KAI- | 开揩锎 |
| KAI+ | 楷偕凯剀恺闿垲铠鍇 |
| KAI\ | 忾欬 |
| KAN- | 看刊堪戡勘龛 |
| KAN+ | 砍坎侃槛冏 |
| KAN\ | 看瞰墈瞰荄阚 |
| KANG- | 康慷糠犨 |
| KANG/ | 扛 |
| KANG\ | 抗亢伉坑炕 |
| KAO- | 考 |
| KAO+ | 考拷烤栲 |
| KAO\ | 靠犒铐 |
| KE- | 苛科搕疴鉲苛搚颏稞柯騍珂轲珂岢坷搕匼棵蝌 |
| KE/ | 壳搳咳 |
| KE+ | 可渴坷岢 |
| KE\ | 克可客刻课恪嗑溘缂愙骒课 |
| KE@ | けア |
| KEI- | 剋 |
| KEN+ | 肯恳垦啃 |
| KEN\ | 裉恨 |
| KENG- | 坑吭铿硁 |
| KI@ | きキ |
| KO@ | こコ |
| KONG- | 空蛩箜 |
| KONG+ | 孔恐倥 |
| KONG\ | 空控 |
| KOU- | 芤眍 |
| KOU+ | 口 |
| KOU\ | 扣叩寇蔻筘 |
| KU- | 哭估骷刳吃膏 |
| KU+ | 苦 |

| | |
|---|---|
| KU\ | 库裤酷苦 |
| XU0 | 夸 |
| KUA- | 夸 |
| KUA+ | 垮侉 |
| KUA\ | 挎跨胯 |
| KUAI+ | 蒯 |
| KUAI\ | 快块筷会侩哙浍脍狯郐鲙 |
| KUAN- | 宽髋 |
| KUAN+ | 款 |
| KUANG- | 匡框筐哐诓洭 |
| KUANG/ | 狂诳 |
| KUANG+ | 夼 |
| KUANG\ | 况矿扩旷框眶诳圹贶 |
| KUI- | 亏岿盔悝溘 |
| KUI/ | 魁揆暌癸奎逵壅喹蝰隗隤夔 |
| KUI+ | 傀跬 |
| KUI\ | 馈匮篑喟匮愦聩篑溃 |
| KUN- | 昆坤髡琨鲲醌鹍鹍 |
| KUN+ | 捆悃阃壸 |
| KUN\ | 困 |
| KUO\ | 扩括阔廓蛞 |
| KYA0 | 卡卡 |
| KYO0 | 卡 |
| KYU0 | 卡 |
| LA- | 拉垃遢 |
| LA/ | 拉砬旯 |
| LA+ | 喇 |
| LA\ | 辣落剌腊蜡瘌傈 |
| LA0 | 蓝啦菔 |
| LAI/ | 来徕莱涞崃铼 |
| LAI\ | 赖睐赉籁濑癞 |
| LAN/ | 兰蓝拦栏蓝褴鋆佅兰仨澜岚栏 |

| | |
|---|---|
| LAN+ | 览揽浽㩾婪栏葛 |
| LAN\ | 烂滥 |
| LANG- | 啷 |
| LANG/ | 郎狼锒廊椰榔烺稂鄉 |
| LANG+ | 朗浪塱朖 |
| LANG\ | 浪莨崀蒗阆 |
| LAO- | 捞 |
| LAO/ | 牢劳痨峤铹醪 |
| LAO+ | 老佬姥涝栳铑 |
| LAO\ | 涝烙洛酪唠涔耢 |
| LE- | 肋 |
| LE\ | 乐勒泐叻簕 |
| LE° | 了饹 |
| LEI- | 播勒 |
| LEI/ | 累雷擂羸镭耪嫘鐳缧 |
| LEI+ | 垒累磊蕾耒耷 |
| LEI\ | 类累泪擂肋酹 |
| LEI° | 嘞 |
| LENG/ | 楞棱僈 |
| LENG+ | 冷 |
| LENG\ | 愣睖掕 |
| LI- | 哩 |
| LI/ | 离厘狸离喱罹黎离莉梨漓缡璃厘狸篱黧骊鹂 |
| LI+ | 礼里娌俚李逦俚理里鑫鲤澧醴蜊 |
| LI\ | 力立利历厉例丽唳吏粒笠戾隶俐荔疠砺励栎莅栗志俪沥青蛎砬莉气栎詈唎匿篱栗礼枥栯马 |
| LI° | 哩痢蜊 |
| LIA+ | 俩 |
| LIAN/ | 连联怜莲涟奁帘帘廉镰鲢镰膦莶 |
| LIAN+ | 脸敛琏 |
| LIAN\ | 恋练炼链殓楝砗 |
| LIAN° | 菈 |
| LIANG/ | 良凉量粮梁粱踉 |
| LIANG+ | 两俩唡魉 |

| | |
|---|---|
| LIANG\ | 谅晾惠冻晾辆靓跟喂 |
| LIAO- | 撩踩 |
| LIAO/ | 辽疗寥聊燎寮缭嘹僚僚獠鹩 |
| LIAO+ | 了潦燎钌蓼 |
| LIAO\ | 了庁料镣撩撂钌 |
| LIE/ | 咧 |
| LIE+ | 裂咧 |
| LIE\ | 劣列烈猎扳冽洌裂躐趔翌埒 |
| LIE* | 咧 |
| LIN/ | 林邻临淋森遴霖磷嶙啉琳辚辚鳞 |
| LIN+ | 廪凛懔檩 |
| LIN\ | 吝赁淋躏简 |
| LING- | 拎 |
| LING/ | 灵冷零玲龄聆囹苓伶羚菱凌棱崚陵绫蓤铃羚翎翎绫绫 |
| LING+ | 令岭领 |
| LING\ | 另令 |
| LIU- | 溜溜 |
| LIU/ | 留流瘤琉硫刘浏馏榴镏瘤胞榴镠 |
| LIU+ | 柳浩 |
| LIU\ | 六陆溜遛馏碌鹨 |
| LO* | 咯 |
| LONG/ | 龙隆窿咙珑眬茏笼沈栊茏癃癃 |
| LONG+ | 垄茏拢陇 |
| LONG\ | 弄巷 |
| LOU- | 搂眸 |
| LOU/ | 筷娄喽偻骸剀蒌溇蛟楼 |
| LOU+ | 搂篓嵝 |
| LOU\ | 漏陋露瘘镂 |
| LOU* | 喽 |
| LU- | 噜 |
| LU/ | 泸庐护颅胪舻鸬户声护泸驴 |
| LU+ | 虏掳卤鲁镥橹 |
| LU\ | 路六陆录绿碌赂戮漉鹭禄潞簏辘甪漉逯禄蔂辂癯鞒鳘 |
| LU* | 护瞳 |

| | |
|---|---|
| LUAN/ | 孪囹峦挛銮栾来崃 |
| LUAN+ | 乱卵 |
| LUN- | 抡 |
| LUN/ | 论伦仑沦轮沦囵轮仑 |
| LUN\ | 论 |
| LUO- | 罗捋 |
| LUO/ | 罗萝芗锣逻视脶镙逻镙 |
| LUO+ | 裸倮瘰瓿蠃 |
| LUO\ | 落洛荦烙摞硌洛摞咯泺漯 |
| LUO* | 罗 |
| LUU/ | 闾驴榈 |
| LUU+ | 侣旅屡履缕褛俊捋褛吕铝稆 |
| LUU\ | 虑律率绿滤氯葎 |
| LUUE\ | 略掠 |
| MA- | 妈摩抹摩蚂 |
| MA/ | 麻呜奔 |
| MA+ | 马吗码蚂玛犸 |
| MA\ | 骂蚂 |
| MA* | 吗嘛蟆 |
| MA9 | 吗么 |
| MAI/ | 埋霾 |
| MAI+ | 买 |
| MAI\ | 卖买迈劢脉 |
| MAI* | 矣 |
| MAN- | 颟 |
| MAN/ | 埋荁瞒谩蔓馒鳗 |
| MAN+ | 满螨 |
| MAN\ | 曼漫慢谩墁墁幔蔓缦熳 |
| MANG- | 忙 |
| MANG/ | 忙盲氓芒茫硭忙杭娏 |
| MANG+ | 莽蟒 |
| MAO- | 猫 |
| MAO/ | 毛犛苖锚矛茅卯锚蝥蟊茄髦 |

| | |
|---|---|
| MAO+ | 卯卵聊邻泖昴 |
| MAO\ | 茂冒帽贸貌袤袂眊瞀瑁瑁耄 |
| ME* | 么麽 |
| ME3 | めメ |
| MEI/ | 眉没煤霉媒枚玫梅脢酶酶楣湄嵋莓郿湄鄘鹛 |
| MEI+ | 每美浼镁 |
| MEI\ | 妹袂媚昧寐魅 |
| MEN- | 闷 |
| MEN/ | 门扪钔 |
| MEN\ | 闷焖懑 |
| MEN* | 们 |
| MENG- | 蒙 |
| MENG/ | 萌盟氓虹蒙曚朦昹曚傍艨礞礞幪 |
| MENG+ | 勐动懵蒙陇锰猛蠓 |
| MENG\ | 梦孟 |
| MI- | 咪眯 |
| MI/ | 迷弥谜麋縻麽弥靡袮猕酰 |
| MI+ | 米敉眯靡脒芈弭 |
| MI\ | 密秘泌蜜觅宓汨幂谧 |
| MI3 | みミ |
| MIAN/ | 眠绵湎 |
| MIAN+ | 免勉娩缅丐冕腼沔渑黾艳 |
| MIAN\ | 面麺 |
| MIAO- | 喵 |
| MIAO/ | 苗描瞄鹋 |
| MIAO+ | 秒抄藐眇眇甦淼缈 |
| MIAO\ | 妙庙缪 |
| MIE- | 乜咩 |
| MIE\ | 灭篾蔑蠛 |
| MIN/ | 民旻岷琘民缗 |
| MIN+ | 敏闵悯愍皿黾泯怋闽湣 |
| MING/ | 名明铭盟鸣冥冥暝瞑茗洺螟 |
| MING+ | 酩 |
| MING\ | 命 |

| | |
|---|---|
| MIU\ | 謬繆 |
| MO- | 摸 |
| MO/ | 磨饃馍馍摩蘑謨膜俱魔劚魔嫫 |
| MO+ | 抹 |
| MO\ | 末没莫陌寞没抹沫秣漠漠脉默墨驀磨慕糢茉万冒磘沫薛潭 |
| MO⁹ | もモ |
| MOU- | 哞 |
| MOU/ | 谋羊牟眸侔蚌鍪 |
| MOU+ | 某 |
| MU/ | 俱誣 |
| MU+ | 母拇姆亩牡姥 |
| MU\ | 不目牧沐暮募墓某睦穆墓馆苜羊化 |
| MU⁹ | むム |
| MYA⁹ | みゃ |
| MYO⁹ | みな |
| MYU⁹ | みゅ |
| N / | 嗯 |
| N ⁹ | ん |
| NA- | 那 |
| NA/ | 拏拏 |
| NA+ | 哪 |
| NA\ | 纳那呐疨鄉钠鈉肭 |
| NA* | 哪 |
| NA⁹ | なナ |
| NAI+ | 乃奶氖芳 |
| NAI\ | 柰耐鼐能佴奈蒘 |
| N''- | 囝 |
| NAN/ | 男难南喃楠 |
| NAN+ | 赧腩 |
| NAN\ | 难 |
| NANG- | 苸呫 |
| NANG/ | 苷儜 |
| NANG+ | 儜儜 |
| NANG\ | 胖 |

| | |
|---|---|
| NAO- | 孬 |
| NAO/ | 挠呶铙蛲鲍猱峱 |
| NAO+ | 恼脑瑙 |
| NAO\ | 闹淖 |
| NE/ | 哪 |
| NE\ | 讷 |
| NE* | 呢 |
| NE@ | 抐木 |
| NEI+ | 馁哪 |
| NEI\ | 内那 |
| NEN\ | 恁嫩 |
| NENG/ | 能 |
| NI- | 妮 |
| NI/ | 泥坭呢尼倪伲霓铌觅鲵鲵 |
| NI+ | 你拟旎 |
| NI\ | 逆匿泥昵溺睨膩 |
| NI@ | 亿二 |
| NIAN- | 拈蔫 |
| NIAN/ | 年粘鲇 |
| NIAN+ | 辇碾捻辇蹍 |
| NIAN\ | 廿念埝 |
| NIANG/ | 娘 |
| NIANG\ | 酿 |
| NIAO+ | 鸟袅瓦 |
| NIAO\ | 尿溺脲 |
| NIE- | 捏 |
| NIE/ | 苶 |
| NIE\ | 臬孽镊陧涅啮隉蘖踂嗫颞乜聂 |
| NIN/ | 您 |
| NING/ | 宁宁拧狞狞聍凝 |
| NING+ | 拧 |
| NING\ | 宁宁拧佞 |

| | |
|---|---|
| NIU- | 妞 |
| NIU/ | 牛 |
| NIU+ | 扭狃钮纽 |
| NIU\ | 拗 |
| NO● | 呢 |
| NONG/ | 农浓哝侬脓 |
| NONG\ | 弄 |
| NOU\ | 耨 |
| NU/ | 奴孥驽 |
| NU+ | 努弩 |
| NU\ | 怒 |
| NU● | 奴又 |
| NUAN+ | 暖 |
| NUO/ | 挪娜傩 |
| NUO\ | 喏诺儒糯苋搦 |
| NUU+ | 女牧 |
| NUU\ | 恧衄衂 |
| NUUE\ | 虐疟 |
| NYA● | 呢 |
| NYO● | 呢 |
| NYU● | 呢 |
| O- | 喔噢 |
| O/ | 哦 |
| O+ | 嗯 |
| O\ | 哦 |
| O● | 办 丅 乤 ヲ |
| OU- | 欧殴瓯讴鸥呕区 |
| OU+ | 偶呕耦藕 |
| OU\ | 怄沤 |
| PA- | 趴啪葩 |
| PA/ | 扒吧耙爬鏊 |
| PA\ | 怕帕靶琶 |
| PA● | ぱ 尺 |
| PAI- | 花 |

| | |
|---|---|
| PAI/ | 排徘牌排簰候 |
| PAI+ | 迫派 |
| PAI\ | 派拜 |
| PAN- | 攀音潘 |
| PAN/ | 胖盤盆槃片蟠蹒磻 |
| PAN\ | 判叛拚盼泮畔袢叠 |
| PANG- | 乓滂膀 |
| PANG/ | 旁庞彷磅膀逄蚄螃 |
| PANG+ | 嗙髈 |
| PANG\ | 胖 |
| PAO- | 泡拋脬 |
| PAO/ | 匏抱匏咆跑刨袍把 |
| PAO+ | 跑 |
| PAO\ | 抱鉋泡 |
| PE? | ペペ |
| PEI- | 胚吁醅 |
| PEI/ | 陪陪賠鉈裴 |
| PEI\ | 佩配帔沛莆旆誖 |
| PEN- | 噴 |
| PEN/ | 盆湓 |
| PEN\ | 噴 |
| PENG- | 烹伻抨砰烹 |
| PENG/ | 朋蓬篷棚鵬膨䩄彭鞷澎 |
| PENG+ | 捧 |
| PENG\ | 碰 |
| PI- | 披批劈丕坯屁丕霏狉邳 |
| PI/ | 皮疲裨脾啤毗陂埤琵仳蒎铮郫鮍纍 |
| PI+ | 匹痞否贔擗搋仳妣芘詑 |
| PI\ | 屁媲譬辟僻澼甓闢 |
| PI? | ピピ |
| PIAN- | 片偏扁萹翩揙 |
| PIAN/ | 便胼研骿 |
| PIAN+ | 谝 |
| PIAN\ | 片骗 |

| | |
|---|---|
| PIAO- | 剽飘剽缥缥 |
| PIAO/ | 嫖瓢朴 |
| PIAO+ | 漂草殍瞟漂 |
| PIAO\ | 票漂瞟 |
| PIE- | 撇瞥氕 |
| PIE+ | 撇苤 |
| PIN- | 拼拼姘 |
| PIN/ | 贫频颦嫔 |
| PIN+ | 品榀 |
| PIN\ | 聘牝 |
| PING- | 乒俜娉 |
| PING/ | 平评坪凭屏帱凭苹净枰鲆鲆 |
| PO- | 泊坡颇泼陂仆朴钹酦 |
| PO/ | 婆鄱繁 |
| PO+ | 叵笸钷 |
| PO\ | 破迫魄珀珀朴 |
| PO* | 捚 |
| PO? | 浮朮 |
| POU- | 剖 |
| POU/ | 裒掊 |
| POU+ | 掊 |
| PU- | 扑朴铺噗 |
| PU/ | 仆匍葡菩蒲璞镨脯濮酺 |
| PU+ | 普谱浦溥圃蹼镨朴氆氇 |
| PU\ | 铺瀑曝堡 |
| PU@ | ぷプ |
| PYA@ | ぴ |
| PYO? | ぴょ |
| PYU@ | ぴゅ |
| QI:- | 七柒期欺戚敲缉沏栖鸶戛蹊破嘁蛊芑撕沏嘁郪 |
| QI/ | 齐奇其歧祈棋脐脐荠竹衹畦耆萁琪埼跂颀骑琪萁祇岐亓伎祁歧淇蕲郪鱼 鳍 |
| QI+ | 起企岂乞启稽荠屺伎芑芑綮 |
| QI\ | 气汽弃亟砌憩讫息器契想跂碛墍碚 |

| | |
|---|---|
| QI* | 七 |
| QIA- | 掐袷 |
| QIA+ | 卡 |
| QIA\ | 洽恰骼 |
| QIAN- | 千仟迁牵签谦铅干扦阡阡悭佥钎纤褰搴芊汧岍骞鹐 |
| QIAN/ | 前钱钳箝虔乾忄掮耳歬袖 |
| QIAN+ | 浅遣谴肷嗛缱 |
| QIAN\ | 欠歉慊倩堑纤椠椠艽茜 |
| QIANG- | 枪抢腔戕呛羌戗牄羟斨羌蜣 |
| QIANG/ | 强墙蔷嫱嫱 |
| QIANG+ | 抢强襁镪羟 |
| QIANG\ | 呛跄戗炝 |
| QIAO- | 敲悄跷锹锹橇雀桀劁 |
| QIAO/ | 桥侨乔翘憔憔瞧谯荞峤鞒硗 |
| QIAO+ | 巧悄雀愀 |
| QIAO\ | 窍峭诮翘撬俏峭鞘 |
| QIE- | 切 |
| QIE/ | 茄伽 |
| QIE+ | 且 |
| QIE\ | 切窃怯妾惬慊挈箧趄郄 |
| QIN- | 亲侵钦衾骎 |
| QIN/ | 勤芹擒琴吟秦芩芹芩矜覃溱螓 |
| QIN+ | 寝锓慬 |
| QIN\ | 沁抣吣 |
| QING- | 青清轻倾卿圊氢蜻蜻 |
| QING/ | 情晴黥擎勍檠檠氰 |
| QING+ | 请顷庼謦苘 |
| QING\ | 庆亲罄謦箐苘 |
| QIONG/ | 穷窮琼茕煢芎邛蛩 |
| QIU- | 秋丘蚯鳅楸萩龟鳌秋犰鞦 |
| QIU/ | 求球囚泅仇遒裘酋逑鼽俅莍璆巯蝤 |
| QU- | 区曲屈趋驱岖祛诎袪蛆躯朐胠蛐麹黢 |
| QU/ | 渠蕖劬罢鸲躯朐鸲癯蟝腒蠼璩 |
| QU+ | 取娶曲苣龋 |

| | |
|---|---|
| QUN\ | 三窘觑阗 |
| QUAN- | 圈悛 |
| QUAN/ | 全权泉痊惓拳痊迋诠绻筌佺荃醛颧鲜 |
| QUAN+ | 犬畎绻 |
| QUAN\ | 劝券 |
| QUE- | 缺阙块 |
| QUE/ | 瘸 |
| QUE\ | 却确悫雀鹊榷搉阕阙 |
| QUN- | 囷逡 |
| QUN/ | 群裙麐 |
| RA? | らラ |
| RAN/ | 然燃䴓 |
| RAN+ | 染冉苒 |
| RANG- | 嚷 |
| RANG/ | 禳禳禳瓤穰 |
| RANG+ | 壤攘吐 |
| RANG\ | 让 |
| RAO/ | 饶桡挠荛 |
| RAO+ | 扰绕娆 |
| RAO\ | 绕 |
| RE+ | 惹喏 |
| RE\ | 热 |
| RE? | れレ |
| REN/ | 人仁任壬 |
| REN+ | 忍荏稔 |
| REN\ | 认任刃仞纫饪牣任任训朝軔䚯 |
| RENG- | 扔 |
| RENG/ | 仍礽 |
| RI\ | 日 |
| RI? | りリ |
| RO? | ろロ |
| RONG/ | 容荣戎绒溶熔融茸嵘蓉榕嵘 |
| RONG+ | 冗氄 |
| ROU/ | 柔揉蹂糅鍒 |

| | |
|---|---|
| ROU\ | 肉 |
| RU/ | 如茹苑孺濡蠕檽嚅薷颥铷 |
| RU+ | 汝辱乳瘑 |
| RU\ | 入溽缛缦蓐洳 |
| RU? | るル |
| RUA\ | 挼 |
| RUAN+ | 软阮 |
| RUI/ | 蕤 |
| RUI+ | 蕊 |
| RUI\ | 瑞锐芮汭芮蚋钠 |
| RUN\ | 闰润 |
| RUO/ | 捼 |
| RUO\ | 若弱偌箬婼蒻爇 |
| RYA? | りゃ |
| RYO? | りょ |
| RYU? | りゅ |
| SA- | 仨撒 |
| SA+ | 洒撒潵靸 |
| SA\ | 卅飒萨 |
| SA? | 掌 |
| SA@ | さサ |
| SAI- | 塞揌腮嘥鳃 |
| SAI\ | 塞赛 |
| SAN- | 三叁弎 |
| SAN+ | 散伞糁馓 |
| SAN\ | 散 |
| SANG- | 丧桑 |
| SANG+ | 嗓搡磉颡 |
| SANG\ | 丧 |
| SAO- | 搔骚臊 |
| SAO+ | 扫嫂 |
| SAO\ | 扫臊瘙 |
| SE\ | 色涩瑟塞啬铯 |
| SE? | せセ |

| | |
|---|---|
| SEN- | 森 |
| SENG- | 僧 |
| SHA- | 沙纱杉杀刹煞砂裟莎鲨砂铩 |
| SHA+ | 傻 |
| SHA\ | 啥厦沙霎嗄煞歃 |
| SHA* | 崇 |
| SHA@ | しゃ |
| SHAI- | 筛酾 |
| SHAI+ | 色 |
| SHAI\ | 晒 |
| SHAN- | 山衫杉扇舢芟删栅珊姗蹒膻潸墠苫苫钐 |
| SHAN+ | 闪陕睒 |
| SHAN\ | 善膳缮扇赡擅骟讪疝汕禅嬗鳝鄯墡埠苫单撣掞剡衫蟮 |
| SHAN* | 蟮 |
| SHANG- | 伤商殇觞墒墒 |
| SHANG+ | 赏上晌垧 |
| SHANG\ | 上尚绱 |
| SHANG* | 裳 |
| SHAO- | 稍烧捎筲梢艄鞘蛸 |
| SHAO/ | 韶勺芍杓苕 |
| SHAO+ | 少 |
| SHAO\ | 少绍哨稍劭邵召邵潲 |
| SHE- | 奢嗻畲畲奢 |
| SHE/ | 舌佘折蛇 |
| SHE+ | 舍 |
| SHE\ | 设社涉射舍赦滠慑歙射麝 |
| SHEI// | 谁 |
| SHEN- | 身伸呻申砷深莘参呻柛 |
| SHEN/ | 什神 |
| SHEN+ | 审谉婶渖沈哂沈矧 |
| SHEN\ | 甚渗肾渗蜃慎参牌 |
| SHENG- | 升生声牲牲笙胜 |
| SHENG/ | 渑渑 |
| SHENG+ | 省眚 |

| | |
|---|---|
| SHENG\ | 胜乘剩盛圣歲 |
| SHI- | 失师诗施湿嘘尸虱著绝狮狮鸦酾 |
| SHI/ | 十什石时识突拾食寔他是坶鲥顾 |
| SHI+ | 史使始矢驶丞泵 |
| SHI\ | 士示似世式是市室事仕视侍恃试势适晋柿饰嗜逝弑拭氏誌恧谥轼而侕哒坠螫饰 |
| SHI° | 匙渣 |
| SHIə | レシ |
| SHOə | しə |
| SHOU- | 收 |
| SHOU/ | 熟 |
| SHOU+ | 手守首 |
| SHOU\ | 寿受偫售瘦受行 |
| SHU- | 弔叔殊侯舒抒扌疏梳躺徒陟好淑蔬受菽醿 |
| SHU/ | 孰熟塾瞭秫 |
| SHU+ | 暑署曙属救柔筍蓍鼠 |
| SHU\ | 术述束庶恕竖树敉戍术墅邀沐忏腧 |
| SHUə | しə |
| SHUA- | 刷唰 |
| SHUA+ | 耍 |
| SHUA\ | 刷 |
| SHUAI- | 衰摔 |
| SHUAI+ | 甩 |
| SHUAI\ | 帅率蟀 |
| SHUAN- | 闩栓拴 |
| SHUAN\ | 涮 |
| SHUANG- | 双霜孀泷鹴 |
| SHUANG+ | 爽 |
| SHUI/ | 谁 |
| SHUI+ | 才 |
| SHUI\ | 税睡说 |
| SHUN+ | 吮 |
| SHUN\ | 顺瞬舜 |
| SHUO- | 说 |

| | |
|---|---|
| SHUO\ | 朔硕妁铄烁颋翙栗 |
| SI- | 私是厶司丝斯嘶撕厮咝斯偲儿思蛊螂鹰虒 |
| SI. | 死 |
| SI\ | 四们俟寺泗驷肆剃伺饣祀肩饲咂箭耜涘兕汜 |
| SI* | 俐 |
| SO@ | ㄙㄚ |
| SONG- | 忪松嵩菘枞淞 |
| SONG. | 怂耸悚辣讯 |
| SONG\ | 宋送讼颂诵 |
| SOU- | 授廋廋溲馊餿嗖鎪鎪 |
| SOU. | 叟叟擞嗽菽 |
| SOU\ | 嗽擞 |
| SU- | 苏稣酥窣 |
| SU/ | 俗 |
| SU\ | 速诉夙素宿缩俾溯恕塑甪觫票诶蔌嗽榡潊潒溹鹔 |
| SU@ | 寸乂 |
| SUAN- | 酸痠狻 |
| SUAN\ | 算篹蒜 |
| SUI- | 虽荾荽濉 |
| SUI/ | 遂随绥隋 |
| SUI. | 髓 |
| SUI\ | 岁碎遂素陵迖稜邃 |
| SUN- | 孙飧玎昅 |
| SUN. | 损笋笙榫 |
| SUO- | 缩俊唆衰茛唢莎挲芟荾 |
| SUO. | 所索鎖琐呐 |
| SUU. | 竽 |
| TA- | 它他她踏塌蹋榻铞揭 |
| TA/ | 荅溚溻蜦 |
| TA\ | 踏踏柘榻蹹唛迖达闼崇 |
| TA* | 遝 |
| TA@ | ㄊㄚ |
| TAI- | 胎台台 |
| TAI/ | 台抬苔炱跆跆邰 |

| | |
|---|---|
| TAI\ | 太汰态泰酞肽钛 |
| TAN- | 贪饨滩摊滩瘫 |
| TAN/ | 谈坛弹痰覃谭潭昙檀苷郯澹 |
| TAN+ | 坦袒忐毯菼袒 |
| TAN\ | 探叹炭碳 |
| TANG- | 汤铛蹚羰 |
| TANG/ | 唐瑭搪塘宣棠溏膛镗樘蛭螗瑭糖郚 |
| TANG+ | 倘躺淌傥耥镋帑 |
| TANG\ | 趟烫 |
| TAO- | 掏滔叨涛韬绦焘 |
| TAO/ | 逃淘陶桃甸桃咷醄洮 |
| TAO+ | 讨绍 |
| TAO\ | 套 |
| TE\ | 特忑忒慝铽 |
| TE@ | 乙于 |
| TENG- | 熥 |
| TENG/ | 疼誊腾誊滕膁 |
| TI- | 踢体梯剔家剔 |
| TI/ | 提题啼蹄绨荑鹈 |
| TI+ | 体 |
| TI\ | 替惕剔涕倜俤屉嚏锡绨薙悌逖趯 |
| TIAN- | 天添鈿 |
| TIAN/ | 田甜恬填佃钿畋菾扣阗 |
| TIAN+ | 忝舔殄腆觍觍 |
| TIAN\ | 掭 |
| TIAO- | 佻佻祧 |
| TIAO/ | 条调迢韶苕笤蜩鲦 |
| TIAO+ | 挑筄眺 |
| TIAO\ | 跳眺粜 |
| TIE- | 贴帖萜 |
| TIE+ | 铁帖 |
| TIE\ | 帖 |
| TING- | 听斤汀桯烃 |
| TING/ | 停庭亭廷蜓莛亭莛莛廷蜓 |

| | |
|---|---|
| TING+ | 挺艇梃铤町侹颋 |
| TING\ | 梃 |
| TO@ | とト |
| TONG- | 通扃 |
| TONG/ | 仝同词侗童瞳彤吐峒僮终莔峝峒垌潼铜酮 |
| TONG+ | 统捅莔揀 |
| TONG\ | 痛胴通同 |
| TOU- | 偷 |
| TOU/ | 头投骰 |
| TOU+ | 鈊 |
| TOU\ | 透 |
| TU- | 突秃凸荚 |
| TU/ | 途圖徒涂屠茶菟骷酥 |
| TU+ | 土吐社 |
| TU\ | 吐兔堍菟 |
| TUAN- | 湍 |
| TUAN/ | 团抟 |
| TUAN+ | 疃 |
| TUI- | 推忒 |
| TUI/ | 颓 |
| TUI+ | 腿 |
| TUI\ | 退蜕裉褪 |
| TUN- | 吞暾 |
| TUN/ | 屯囤饨豚臀鲀 |
| TUN\ | 褪 |
| TUO- | 脱拖托扥 |
| TUO/ | 柁驼鸵砣陀坨驮铊佗沱酡鼍 |
| TUO+ | 妥椭庹 |
| TUO\ | 拓唾跅魄拆萚萚 |
| U@ | ゥヮ |
| WA- | 挖瓦洼哇蛙娲 |
| WA/ | 娃 |
| WA+ | 瓦佤 |
| WA\ | 袜腽 |
| WA* | 哇 |

| | |
|---|---|
| WA\ | 哇？ |
| WAI- | 歪唱 |
| WAI+ | 崴 |
| WAI\ | 外 |
| WAN- | 弯湾剜豌帆 |
| WAN/ | 完丸玩顽纨烷 |
| WAN+ | 挽晚宛惋婉碗皖浣宛菀豌皖 |
| WAN\ | 万阅蔓 |
| WANG- | 汪 |
| WANG/ | 王亡芒 |
| WANG+ | 往枉网罔偎辋惘 |
| WANG\ | 望往忘妄王旺 |
| WEI- | 危威委萎微逶煨沩偎隈葳苇崴魏 |
| WEI/ | 为围违韦桅唯推维唯帏闱鬼潍圩沩濰 |
| WEI+ | 伟尾伪委萎娓纬唯诿最娓逶炜玮苇頠洧院 |
| WEI\ | 卫为位未味畏胃谓尉慰蔚喂渭遗猬喂魏 |
| WEN- | 温瘟榅鳁 |
| WEN/ | 文闻纹坟蚊芠阌 |
| WEN+ | 吻稳刎紊扱 |
| WEN\ | 问纹汶 |
| WENG- | 翁嗡滃鹟鹟 |
| WENG+ | 滃蓊 |
| WENG\ | 瓮蕹 |
| WO- | 倭喔涡窝莴挝腘知 |
| WO+ | 我 |
| WO\ | 握卧沃斡帷濩渥涴渥硪 |
| WU- | 屋污诬恶圬巫乌呜於邬鸣 |
| WU/ | 无吾毋亡吴芜蜈梧浯郚醍 |
| WU+ | 五午武侮伍仵迕妩忤捂悟羞鹉仵虎洼 |
| WU\ | 务误物恶悟晤戊刈雾兀坞寤焐靰扤婺鹜鋈鹜 |
| XI- | 夕西吸昔息希惜悉兮牺稀塘折嘻锡奚溪傒蹊熙膝喝熹汐亨矽茜栖晒栖氙栖唏晞甜欷浠娭豨欷菥淅晰蜥螅僖嘻熹禧犀硒曦肸羲噏瘜豀曦 |
| XI/ | 习席媳袭隰檄觋嶍蟴 |

| | |
|---|---|
| XI+ | 洗喜徙葸禧玺屐蒽铣枲蜶 |
| XI\ | 细戏系盻邰隙舄舃阋衋汽 |
| XIA- | 虾瞎呷 |
| XIA/ | 侠峡狭匣恨辖暇遐霞瑕黠硖 |
| XIA\ | 下吓唬夏厦罅 |
| XIAN- | 先仙纤鲜芝掀銛氙籼酰㾾 |
| XIAN/ | 闲贤衔咸潇弦舷涎得娴痫鹇 |
| XIAN+ | 显险鲜铣蚬燹藓冼跣笔冼洗猃 |
| XIAN\ | 现见旲縣宪限陷线缐羡献腺线岘见倍 |
| XIANG- | 乡香相箱脜襄蘘缃瓖湘芗骧 |
| XIANG/ | 详祥降翔庠 |
| XIANG+ | 享想响饷飨鲞 |
| XIANG\ | 向苘相项象像傧 |
| XIAO- | 肖消宵逍销霄削枵硝绡嚣枭哓哓哮鸮髐萧潇蟂筱嗃蛸 |
| XIAO/ | 洧洨崤 |
| XIAO+ | 小晓筱 |
| XIAO\ | 笑校效孝肖啸 |
| XIE- | 些猒蝎猰猰 |
| XIE/ | 协叶挟鞋斜邪偕谐浆肋挈颉撷缬擷 |
| XIE+ | 写血 |
| XIE\ | 屑械泄泻卸亵谢懈解邂澥榭薢渫泄燮爕蹀溘㹸地夯 |
| XIN- | 心芯新欣䀠訢忻新昕馨莘䒕焮 |
| XIN/ | 寻 |
| XIN\ | 信囟芯衅 |
| XING- | 兴星惺腥猩 |
| XING/ | 行形刑型酮饧陉邢钘铏荥 |
| XING+ | 醒省擤 |
| XING\ | 佳娃幸兴悻婞杏荇 |
| XIONG- | 兄凶胸讻汹哥訩 |
| XIONG/ | 硅能 |
| XIONG\ | 汹宧 |
| XIU- | 羞休修俢庥咻庥䰠髤 |
| XIU+ | 宿朽 |
| XIU\ | 秀臭僖袖莠嗅湨篍岫琇 |

| | |
|---|---|
| XU- | 须需虚戌圩墟吁嘘歔昏谞顸胥盱 |
| XU/ | 徐 |
| XU+ | 许浒诩栩 |
| XU\ | 序叙旭绪洫罕蓄蓿恤勖煦婿勋酗叙 |
| XU* | 蓿 |
| XUAN- | 宣轩喧揎萱暄谖瑄谖韄 |
| XUAN/ | 玄旋悬漩漩泫 |
| XUAN+ | 选烜癣 |
| XUAN\ | 旋渲炫眩泫楦券绚弦 |
| XUE- | 削靴薛 |
| XUE/ | 学穴噱茓学岀 |
| XUE+ | 雪鳕 |
| XUE\ | 血谑 |
| XUN- | 勋薰蕈醺曛埙窨 |
| XUN/ | 寻巡旬洵恂询循驯峋桪珣郇荀鄩噚浔鲟 |
| XUN\ | 训讯迅汛殉徇逊熏蕈浚巽噀 |
| YA- | 丫呀压押鸭鸦哑桠 |
| YA/ | 牙芽衙涯厓睚伢玡岈蚜钘 |
| YA+ | 雅哑痖 |
| YA\ | 亚讶迓轧揠姐垭挜砑氩贾 |
| YA* | 呀 |
| YA@ | 也巴 |
| YAN- | 烟咽胭蔫淹腌阉嫣湮殷恹崦燕阏耶 |
| YAN/ | 言炎研沿延严岩盐筵颜妍蜒檐芫铅阎 |
| YAN+ | 眼演奄掩俨衍偃弇罨剡琰兖郾蝘蝘魇甗 |
| YAN\ | 厌咽彦谚沿宴焰验艳砚唁焱垦燕堰雁赝滟厣酽旺谳 |
| YANG- | 央秧决殃鞅鸯 |
| YANG/ | 羊洋阳飏扬杨佯烊徉炀杨疡徉鲜 |
| YANG+ | 仰养痒氧 |
| YANG\ | 样恙怏烊漾秧 |
| YAO- | 天妖要腰邀约幺吆 |
| YAO/ | 谣遥摇肴侥窑飘爻桃瑶珧轺徭尧尧峣姚陶嶤 |
| YAO+ | 咬杳昝窈 |

| | |
|---|---|
| YAO\ | 耀药疟胡耀眼说勒 |
| YE- | 掖噎耶椰爷 |
| YE/ | 爷耶椰 |
| YE+ | 也冶野 |
| YE\ | 业液页叶夜咽谒液掖腋烨邺晔 |
| YI- | 一衣依医式壹伊猗揖噫呀铱彝漪繄嫛祎鹥 |
| YI/ | 仪移宜疑姨怡贻姨遗诒逐痍饴迤匜蛇嵎熨胰彝施沂眙宦颐疑彝 |
| YI+ | 已以倚荷苯迤倚蚁舣乙忆苡尾螘 |
| YI\ | 义议艺亿忆亦衣抑役异易逸益意谊翌疫肄毅译驿诣屹泡悒悸驿艳轶绐溢裔翳翊冽乂弈奕廙浃佚映泽弋艾吃缢螠轶殹瘗罴邑峄薏懿镱俏 |
| YIN- | 因音阴姻殷喑愔茵荫洇湮捆氤 |
| YIN/ | 吟姪寅垠银龈斋信霪垩鼝喑垠 |
| YIN+ | 引饮隐瘾尹蚓 |
| YIN\ | 印饮喜荫愁胤靷 |
| YING- | 英应笑鹰膺璎罂罂眨嘤撄萦婴嫈 |
| YING/ | 迎莹盈楹嬴蝇茔萤茕荧茎莹滢萦潆嬴 |
| YING+ | 影颖郢颍瘿 |
| YING\ | 应硬映膑 |
| YO- | 唷哟 |
| YOo | 吆幺 |
| YONG- | 拥佣庸雍壅痈痈憎墉邕忍镛鳙鄘 |
| YONG/ | 喁颙 |
| YONG+ | 永勇泳恿涌踊埇俑甬 |
| YONG\ | 用泖 |
| YOU- | 忧优攸悠幽呦 |
| YOU/ | 尤犹由油邮游柚猷轴抽攸尢莸虬蝣鲦 |
| YOU+ | 友有莠酉牖卣羑颡黝 |
| YOU\ | 又右幼佑祐诱宥囿柚圈侑柚狖蝣鼬 |
| YU- | 迂迂于纡瘀 |
| YU/ | 余与于予娱愉愚鱼渔虞敌于孟臾谀隅揄腴逾渝觎好旱畬馀雩周屿臾腴俞斋衙揄蝓瑜 |
| YU+ | 予与雨语羽宇屿龋圉龉伛臾圄禹貐 |
| YU\ | 育顼玉与欲浴吁蓣裕驭遇寓蓣域语雨喻谕翳御豫怨郁昱蔚毓于谷辛尉狱预狂峪渊煜涡閾棫蜮鸢獘瘐衽焐遹阏罤 |

| | |
|---|---|
| YU\ | 吁 |
| YUAN- | 冤渊鸢鸳鹃鸳 |
| YUAN/ | 元原源圆员园爰援猿娘缘圆垣元沅辕袁袁塬媛顿 |
| YUAN+ | 远 |
| YUAN\ | 院怨愿苑垸瑗媛探 |
| YUE- | 曰约瘦 |
| YUE+ | 哕 |
| YUE\ | 月乐朗岳跃悦说阅越钺刖玥崙栎粤樾 |
| YUN- | 晕 |
| YUN/ | 云匀纭耘芸昀畇筠涢郧鋆 |
| YUN+ | 允陨预犹 |
| YUN\ | 运晕愠孕韵蕴熨缊韫酝员伴郓 |
| ZA- | 扎匝咂抄 |
| ZA/ | 杂咱砸 |
| ZA+ | 咋 |
| ZA" | 腌 |
| ZA? | 㞗 |
| ZAI- | 灾哉裁甾 |
| ZAI+ | 宰载崽 |
| ZAI\ | 在再载 |
| ZAN- | 簪错 |
| ZAN/ | 咱 |
| ZAN+ | 攒趱昝拶 |
| ZAN\ | 暂赞瓒瑣 |
| ZANG- | 脏赃牂臧 |
| ZANG+ | 驵 |
| ZANG\ | 葬藏脏奘 |
| ZAO- | 遭糟 |
| ZAO/ | 凿 |
| ZAO+ | 早澡蚤枣藻 |
| ZAO\ | 造灶皂噪燥躁唣 |
| ZE/ | 则责择泽舴迮啧帻箦赜 |
| ZE\ | 侧仄昃 |
| ZE? | 怎 |

| | |
|---|---|
| ZEI/ | 贼 |
| ZEN+ | 怎 |
| ZEN\ | 谮 |
| ZENG- | 曾增憎增膪 |
| ZENG\ | 赠综锃甑 |
| ZHA- | 扎渣揸挓吒咋哳叀喳楂揸多 |
| ZHA/ | 札扎炸轧闸铡 |
| ZHA+ | 眨拃苲苲 |
| ZHA\ | 乍诈佐榨咋蚱蜤痄作多溠咤蚝蜡醡 |
| ZHAI- | 摘斋侧 |
| ZHAI/ | 择宅翟 |
| ZHAI+ | 窄崽 |
| ZHAI\ | 债寨砦瘵瘵 |
| ZHAN- | 占沾粘毡旃詹瞻邅 |
| ZHAN+ | 展斩崭盏搌嶘斩黵 |
| ZHAN\ | 占站战栈绽湛颤醮 |
| ZHANG- | 张章彰獐漳嫜璋蟑滜 |
| ZHANG+ | 长涨掌礃仉 |
| ZHANG\ | 仗丈仗帐胀涨障幛嶂瘴 |
| ZHAO- | 招昭钊着朝啁嘲 |
| ZHAO/ | 着 |
| ZHAO+ | 找爪沼 |
| ZHAO\ | 召兆诏照炤棹罩肇赵笊曌 |
| ZHE- | 折遮蜇 |
| ZHE/ | 折哲喆谪辄蛰蛰辙磔 |
| ZHE+ | 者赭锗褶 |
| ZHE\ | 这蔗柘浙鹧浙 |
| ZHE+ | 着 |
| ZHEI\ | 这 |
| ZHEN- | 针臭珍贞侦砧甄斟箴揕臻胗帧帧祯榛溱榛獉 |
| ZHEN+ | 枕诊疹稹缜彡眕 |
| ZHEN\ | 阵朕育赈赈圳揕纼镇胗 |

| | |
|---|---|
| ZHENG- | 正征症争挣睁峥丞蒸丁证钲筝铮狰 |
| ZHENG+ | 整拯 |
| ZHENG\ | 正证政症挣诤帧钲郑闸 |
| ZHI- | 知支只之汁技芝吱肢织指抵脂胝郯榗栀氏卮蜘胣 |
| ZHI/ | 直值侄执职植殖指埴德寮跖踯踬 |
| ZHI+ | 只止咫址趾纸指咫沚正祉枳抵徵酯 |
| ZHI\ | 志识至致治制置贯秩稚置炙帜峙掷挚滞帙桎轾雉彘帙痣痔疐颉室忮徏碡蛭腟豸屋到滍蛮陟膣 |
| ZHONG- | 中忠终衷钟盅松鑫 |
| ZHONG+ | 种肿踵冢 |
| ZHONG\ | 众种中仲重 |
| ZHOU- | 周舟州洲侜诌啁绸粥朝䏺蛰 |
| ZHOU/ | 轴妯 |
| ZHOU+ | 肘帚 |
| ZHOU\ | 昼宙咒骤皱怞纣轴酎荮纣胄伣甃籀 |
| ZHOU* | 碡 |
| ZHU- | 朱诸诛株猪殊朱侏蛛铢沬邾潴獚储 |
| ZHU/ | 竹逐烛躅木兰筑瘃竺 |
| ZHU+ | 主往煮瞩瞩属渚 |
| ZHU\ | 住助注柱驻祝著箸筑铸蛀妊伫贮苎纻杼疰硅霔 |
| ZHU@ | フツ |
| ZHUA- | 抓挝 |
| ZHUA+ | 爪 |
| ZHUAI- | 拽 |
| ZHUAI+ | 跩 |
| ZHUAI\ | 拽 |
| ZHUAN- | 专砖䏝颛 |
| ZHUAN+ | 转 |
| ZHUAN\ | 赚转传撰篆僎啭 |
| ZHUANG- | 妆装庄桩 |
| ZHUANG+ | 装 |
| ZHUANG\ | 壮状撞幢僮 |
| ZHUI- | 追锥佳椎骓 |
| ZHUI\ | 坠惴缀赘缒膇 |

| | |
|---|---|
| ZHUN- | 谆屯迍窀肫 |
| ZHUN+ | 准凖 |
| ZHUO- | 捉卓桌拙倬焯柷𠲼涿 |
| ZHUO/ | 着浊均酌濯擢浞茁斫琢诼啄镯裰 |
| ZI- | 资咨姿孜滋仔孜孳咨龇赀訾峣赼淄辎缁缁 |
| ZI+ | 子仔姊紫梓滓訾秭 |
| ZI\ | 自字恣渍眦 |
| ZIe | ジ ジ |
| ZOe | ゴ ジ |
| ZONG- | 宗综踪棕枞 |
| ZONG+ | 总偬 |
| ZONG\ | 纵粽 |
| ZOU- | 邹驺鄹诹陬 |
| ZOU+ | 走 |
| ZOU\ | 奏揍 |
| ZU- | 祖菹 |
| ZU/ | 足卒族镞 |
| ZU+ | 祖阻袓组诅 |
| ZUe | ズ ズ ヅ |
| ZUAN- | 钻躜 |
| ZUAN+ | 纂缵 |
| ZUAN\ | 赚钻 |
| ZUI- | 堆 |
| ZUI+ | 嘴咀 |
| ZUI\ | 最罪醉辠蕞檇 |
| ZUN- | 尊遵僔鳟 |
| ZUN+ | 撙 |
| ZUO- | 作嚼 |
| ZUO/ | 昨作莋笮 |
| ZUO+ | 左佐撮 |
| ZUO\ | 做作坐座唑莋作作阼作岝胙酢 |

| | |
|---|---|
| ZUO* | 何步基 1979年，1981年 版权所有 不得翻印 |
| ZYA9 | Lë |
| ZYO9 | Lö |
| ZYU9 | Lü |
| Z - | ⸺ 。 · ． ， ； ！ ？ ： " 【 】 《 》 ≤ |
| Z / | ! " # $ % & ' ( ) * + , - . / 0 1 2 3 4 5 6 7 8 9 : ; < = > ? |
| Z * | @ A B C D E F G H I J K L M N O P Q R S T U V W X Y Z [ \ ] ^ _ |
| Z \ | ` a b c d e f g h i j k l m n o p q r s t u v w x y z { | } ~ ⌐ |
| Z • | А Б В Г Д Е Ж З И Й К Л М Н О П Р С Т У Ф Х Ц Ч Ш Щ Ъ Ы Ь Э Ю Я |

COPYRIGHT (c) 1979, 81 BY PAUL HO

What is claimed is:

1. A phonetic multi-lingual word processor comprising: a display means having a screen; a keyboard connected to the display means for causing characters of a selected language each representing the consonant and vowel portions of corresponding words to be displayed on the screen of said display means, said keyboard having a plurality of keys respectively having first inscriptions inscribed thereon corresponding phonetically to the consonant portions of the words represented by said characters, and said keys having second inscriptions inscribed thereon corresponding phonetically to the vowel portions of the words represented by said characters; a memory in which all of the characters to be displayed on said screen are stored as multi-bit digital signals, with each such character being stored at a different address location; control circuitry interconnecting the keyboard, the display means and the memory and operating so that the actuation of a selected key corresponding phonetically to the consonant sound of a desired character and to the subsequent actuation of a second key corresponding to the vowel sound of the desired character causes a number of said memory locations in said memory to be addressed so that a plurality of characters including the desired character and variants of the desired character to appear on a first portion of said screen; and manually operated control means connected to said display means for selecting the desired character from the displayed characters and for transferring the desired character to a second portion of said screen.

2. The word processor defined in claim 1, in which said first inscriptions are inscribed on the tops of the keys and said second inscriptions are inscribed on the front faces of the keys.

3. The word processor defined in claim 2, in which the inscriptions inscribed on the top of said keys correspond to the consonant letters of a standard typewriter keyboard.

4. The word processor defined in claim 1, and which includes at least one magnetic disc drive in which the characters to be stored in said memory are magnetically recorded.

5. The word processor defined in claim 1, in which certain of the keys of said keyboard are inscribed with inscriptions representing certain standard tones, a selected one of said last-named keys being operated after the operation of the aforesaid selected key and of said second key when the tone of the desired word is known so as to reduce the number of variants of a desired word to be displayed on said first portion of said screen.

* * * * *